(12) United States Patent
Scanlon

(10) Patent No.: US 6,802,879 B2
(45) Date of Patent: Oct. 12, 2004

(54) VACUUM COLLECTION BAG AND METHOD OF OPERATION

(75) Inventor: John James Scanlon, Wilmington, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/073,724

(22) Filed: Feb. 11, 2002

(65) Prior Publication Data

US 2002/0166449 A1 Nov. 14, 2002

Related U.S. Application Data

(63) Continuation of application No. 09/847,808, filed on May 2, 2001, now abandoned.
(60) Provisional application No. 60/201,654, filed on May 3, 2000, and provisional application No. 60/268,183, filed on Feb. 13, 2001.

(51) Int. Cl.[7] .............................................. B01D 46/02
(52) U.S. Cl. ............................ 55/367; 55/369; 55/377; 55/379; 55/DIG. 2; 55/DIG. 3; 55/385.3; 15/352; 15/353; 493/186; 493/214
(58) Field of Search ......................... 55/367, 369, 377, 55/379, 385.3, DIG. 2, DIG. 3; 15/352, 353; 493/186, 214

(56) References Cited

U.S. PATENT DOCUMENTS

| | | | | |
|---|---|---|---|---|
| 1,403,112 A | * | 1/1922 | Ford ........................... | 55/364 |
| 1,504,136 A | * | 8/1924 | Patterson et al. ............. | 55/364 |
| 1,561,928 A | * | 11/1925 | Jaquith ........................ | 55/364 |
| 1,802,228 A | * | 4/1931 | Witte ........................... | 55/364 |
| 1,828,584 A | * | 10/1931 | Andersen ...................... | 96/227 |
| 1,881,086 A | * | 10/1932 | Marshall ....................... | 96/226 |
| 1,924,249 A | * | 8/1933 | Marshall ....................... | 55/364 |
| 3,961,921 A | * | 6/1976 | Heiman et al. ................ | 55/364 |
| 5,507,847 A | * | 4/1996 | George et al. ................. | 55/486 |
| 6,007,594 A | | 12/1999 | Kaczor | |
| 6,010,561 A | * | 1/2000 | Dyson ........................... | 96/63 |
| 6,156,086 A | * | 12/2000 | Zhang .......................... | 55/382 |
| 6,277,165 B1 | * | 8/2001 | Lovett et al. .................. | 55/374 |

OTHER PUBLICATIONS

International Association of Floor Care & Sewing Professionals (VDTA) Jul. 23, 2001, p. 1, Lines 1&2, 3–6, 12–13, website Vacuum Bags page USA.

QVC Inc, Order Entry Page (Product H66538) Hoover Wind Tunnel Upright Vacuum Cleaner, p. 1, Lines 1 and 8 May 17, 2000, web site. USA © 2000.

Eureka Web site, "What is an Upright Cleaner good for?" p. 2 lines 14–15 and 32–34, May 17, 2000, USA © 2000.

Eureka web site,"Filtration Story" p. 1, lines 20–21 and 25–27 and p. 2, lines 6–8, May 17, 2000 USA © 2000.

QVC, Inc Order Entry Page (Product H62665) Sanyo Sc–v126 Performax Upright Vacuum Cleaner p. 1, lines 5–6, May 17, 2000 © 2000 USA web site.

(List continued on next page.)

Primary Examiner—Minh-Chau T. Pham
(74) Attorney, Agent, or Firm—Carol A. Lewis White

(57) ABSTRACT

The present invention is an improved vacuum collection bag for vacuum cleaners and other appliances. By employing an impermeable bag and an air-permeable particle separator together with a tight seal against a vacuum system dirt tube in place of a conventional paper bag filter, it has been determined that the vacuum cleaner bag can be reused and significantly improve the filtration performance of the vacuum system.

15 Claims, 18 Drawing Sheets

OTHER PUBLICATIONS

QVC, Inc Order Entry Order Entry Page (Product H62652) Panasonic Heavy Duty Plus Upright Vacuum Cleaner, p. 1, lines 5–6, May 17, 2000, © 2000, USA, web site.

Sears Kenmore web site Order Entry Page, Product 30012 Kenmore Quick Clean Upright Vacuum Cleaner, p. 1 lines 10 and 12, May 17, 2000, USA © 1999.

Sears Kenmore owners Manual, Upright Vacuum Cleaner p. 14, col. 1, lines 40–55, and p. 15 colums 3 and 4, lines 1–55, USA.

Miele Appliance Brochure, "Introducing the new power in vacuum cleaner technology . . . ", p. 4, col. 2, lines 1–21 USA.

Miele Appliance web site, "Breathe Easy" p. 2, lines 5–20, May 17, 2000, USA.

Simplicity Brochure, "Bringing you cleaner Living", p. 2 cols. 1 and 2, paragraph 1. Simplicity website, "Simplicity 7000 Deluxe Series"p. 1 lines 5 and 15 and p. 2, line 25, May 17, 2000, USA.

* cited by examiner

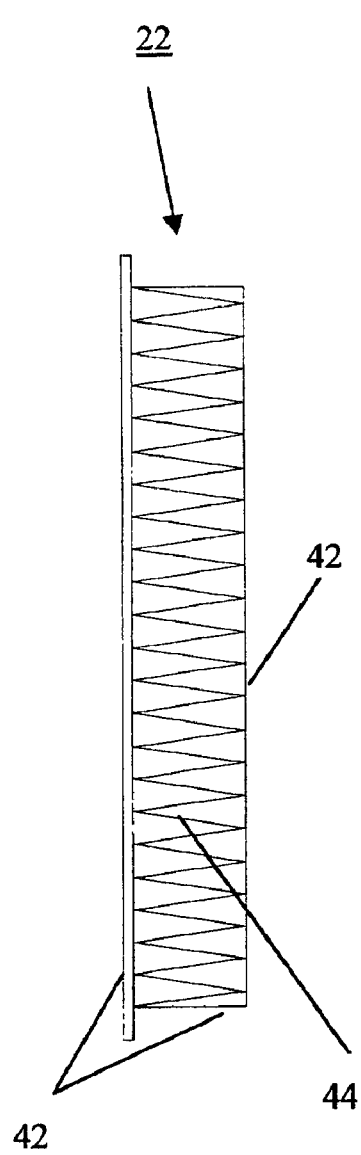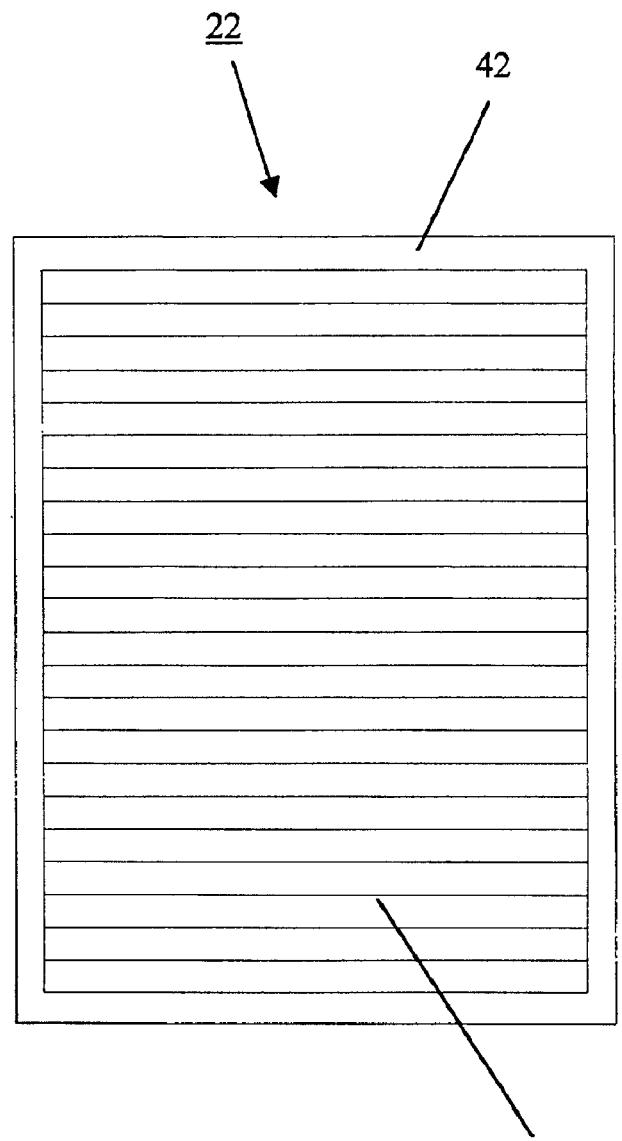
FIG. 5
FIG. 6

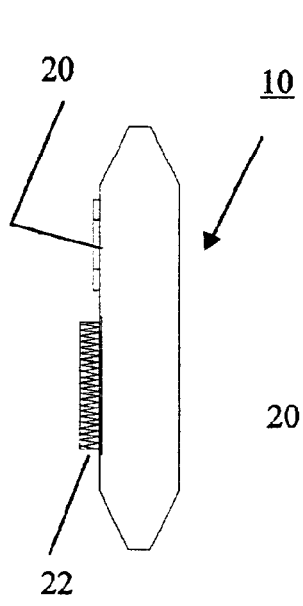
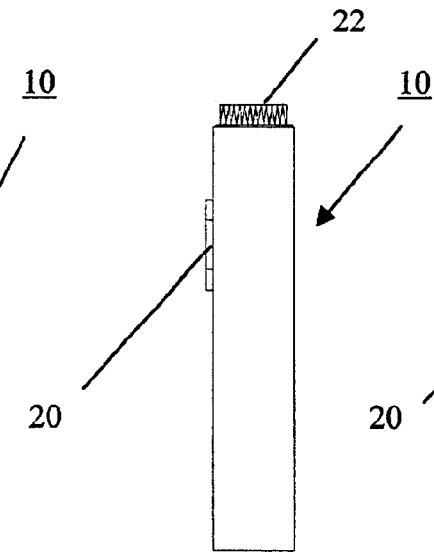
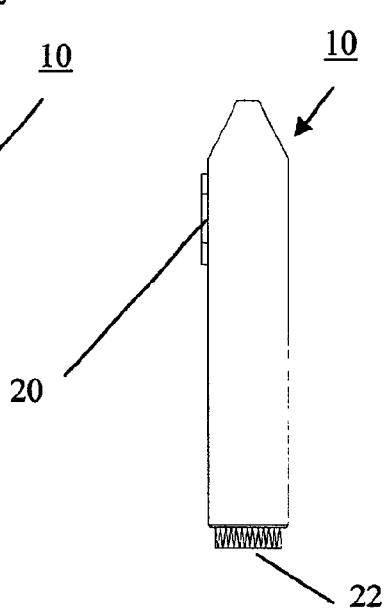
FIG. 23  FIG. 24  FIG. 25
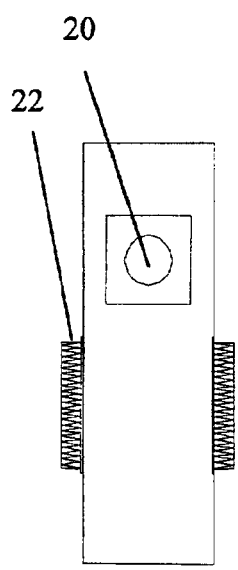
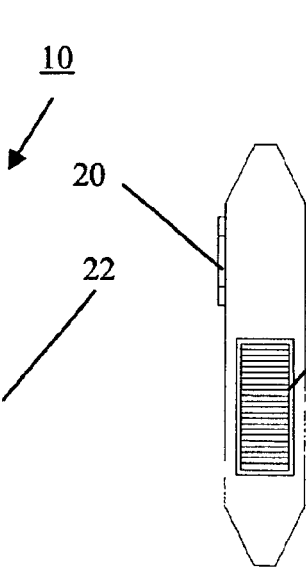
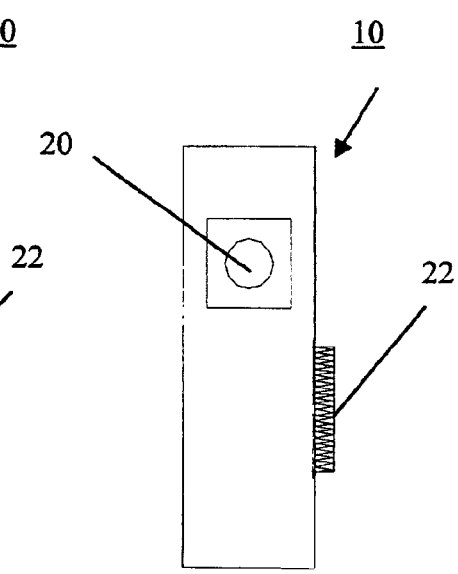
FIG. 26  FIG. 27  FIG. 28

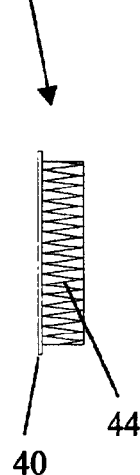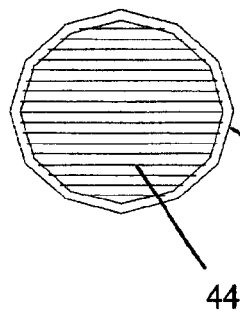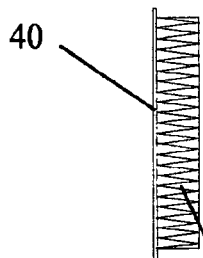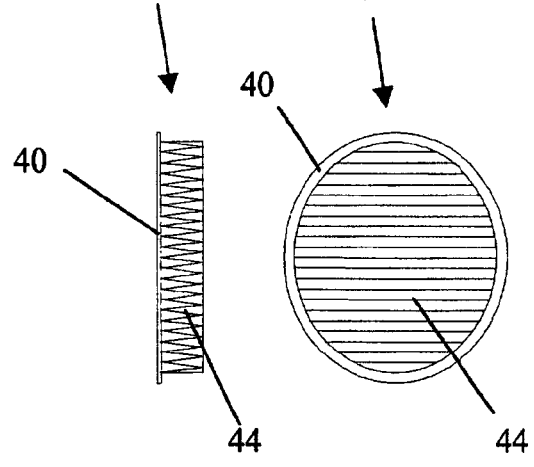
FIG. 29  FIG. 30     FIG. 31  FIG. 32
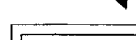
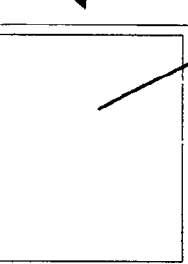
FIG. 33  FIG. 34

VACUUM COLLECTION BAG AND METHOD OF OPERATION

This application is a continuation of Ser. No. 09/847,808 filed May 2, 2001 now abandoned, which claims benefit of Ser. No. 60/201,654 filed May 3, 2000 and claims benefit of Ser. No. 60/268,183 filed Feb. 13, 2001.

BACKGROUND OF INVENTION

1. Field of Invention

The present invention relates to collection bags in appliances, such as a vacuum cleaner.

2. Description of Related Art

A variety of vacuum cleaners are presently available that collect dirt in a disposable paper bag filter. These vacuum cleaners are found in several forms including upright, canister, and wet/dry vac configurations. These device are sold under the brand names Hoover, Eureka, Royal Dirt Devil, Panasonic, Sanyo, Sears Kenmore, SHOP-VAC, Sears Craftsman, Ridgid, Genie, etc.

The majority of vacuum cleaners purchased today utilize a porous paper bag to filter and store dust collected by a vacuum cleaner. As air pneumatically conveys dirt into the bag, it exits through the porous paper media surrounding the cavity leaving the large dirt in the bag. Because of the relatively poor filtration efficiency of paper filter media, better vacuum cleaners employ multi-stage filtration systems that generally employ a HEPA backup filter to capture fine dust that penetrates through the paper bag filter. Lower-end vacuum cleaners have no backup filter and since consumers cannot retrofit their vacuum cleaner with a backup filter, they must suffer with dust emissions from their vacuum cleaners. Vacuum cleaners employing paper bag filters without backup filters provide such poor filtration that fine dust can be visually found accumulating on the inside of the vacuum cleaner housing that encompasses the paper bag filter. These dust emissions can also reduce the vacuum cleaner's life by contaminating the motor in the suction device.

The filtration efficiency of a paper vacuum cleaner bag of the prior art is also reduced due to the design of the bag. In most paper vacuum cleaner bags the dirt enters the bag inlet at a high velocity and the dirt impacts the opposite wall of the bag. Thus the high velocity dirt particles penetrate the porous paper media resulting in low filtration efficiency.

Generally, paper bag filters need replacement monthly and HEPA filters require replacement annually. Over the life of the vacuum cleaner, the cost of replacement filters is often greater than the original cost of the original vacuum cleaner. In addition, it is of great inconvenience to the consumer to shop around locating the proper size vacuum cleaner bag to fit their vacuum cleaner. Moreover, disposable paper bag filters put unnecessary waste in our environment.

Because paper filter media is very porous, fine dust is traveling at a high velocity and it has a tendency of becoming trapped in the pores of the paper bag. Therefore the paper bag filter loses its permeability. As a consequence, the paper bag filters have limited reusability. In fact, it is well known that vacuum cleaners lose their ability to clean and pick up dirt as the paper bag is filled. This is because the partially clogged paper media restricts the airflow through the vacuum cleaner preventing it from collecting dust deeply embedded in carpet fibers. Therefore, most paper vacuum cleaner bag filters sold today are sealed shut so that the contents cannot be emptied and the bag reused.

U.S. Pat. No. 6,007,594 to Kaczor (1999) shows a multiple use vacuum cleaner bag which is of paper media construction thus offering poor filtration performance and limited reusability since the paper media clogs with particulate with use and it cannot be washed.

Vacuum cleaner bags of the prior art sometimes have electrostatically charged media lining the inside of the paper bag or consist of one thick layer of electrostatic media to improve the filtration efficiency of the bag. Typically, these type bags increase the filtration efficiency but not to the level of a HEPA filter. This improvement in filtration efficiency, however, decreases with time as the electrostatically charged sites on the media, which capture fine dust particles, become covered with dust and lose their ability to attract dust. Furthermore, these bags become clogged and manufacturers recommend that they be replaced when full.

Paper vacuum cleaner bags and the like are opaque and therefore the contents of the bag cannot be visually inspected. Consumers also have a tendency to overfill their paper bag filters. They either forget to check their bag filter's contents because they cannot see through the opaque paper or they intentionally try to fill it completely to save money on purchasing replacement bags. This not only adversely affects the ability of the vacuum cleaner to clean, but it also frequently causes the bags to burst. Storing dust in vacuum cleaner bags between uses also has a tendency to develop strong odors. These offensive odors are most noticeable when the vacuum cleaner is first turned on.

In cases of wet/dry vacs used in construction, heavy materials such as cement and plaster dust can cause paper bags to rip when lifted out of the vacuum cleaner. In addition, sharp objects like nails, broken glass, wood chips etc. can cause paper bags to rip while in use. Furthermore, paper bags deteriorate and normally rip when liquids are collected.

As mentioned earlier, the poor filtration characteristics of paper bag filters is generally compensated for by creating multistage filtration systems comprised of a porous bag filter followed up by a backup or series of backup filters. The prior art, for instance, employs one of or a combination of electrostatic, non-woven or microfiberglass filters as a backup filtration system. These multistage filtration systems add significant cost and complexity to a vacuum cleaner.

In order to deliver high filtration efficiency, vacuums featuring multistage filtration systems require additional mechanical seals between each filtration stage to ensure all the air flowing through the vacuum cleaner is filtered and that no air bypasses the filters. Moreover, the chambers that house each filtration stage must be sealed to avoid leakage of dust through cracks in the vacuum cleaner housing. These additional seals add cost to manufacturing a vacuum cleaner and are the potential source of failure in-use from gasket damage, dry rot, and so on. Upon failure, these leaking joints in the vacuum cleaner not only can cause dust leaks into the surrounding environment but they can also decrease the suction of a vacuum cleaner and its ability to clean debris located deep down in carpet fibers.

Vacuum cleaner bags cannot be manufactured from commonly used high efficiency filter medias. If, for example, vacuum cleaner bags were manufactured from microfiberglass like most vacuum cleaners HEPA filters, the bags would be too brittle. Upon normal handling and usage the fibers would break and cause leakage of dust particles. Therefore hazardous materials such as medical waste or carcinogens cannot be contained in the bag for safe disposal and without contaminating the vacuum cleaner.

Vacuum cleaner bags also cannot be easily manufactured from expanded polytetrafluoroethylene (PTFE) membrane in current bag designs because current vacuum cleaner bag designs physically limit the amount of filtration media that can be used to that which is required to form a bag. This makes it difficult to adjust the amount of media to compensate for using less permeable, high efficiency media.

Many consumers already own vacuum cleaners that perform well with the exceptions of needing replacement vacuum cleaner bags and having low filtration efficiency. And there are consumers that have a genuine need to improve the filtration efficiency of their vacuum cleaner for health reasons and cannot afford the high-end vacuum cleaners that come equipped with HEPA filters. These consumers have no attractive method to retrofit their vacuum cleaner with an economical high efficiency vacuum cleaner bag.

The present invention addresses the aforementioned limitations of the prior art by providing a high efficiency vacuum cleaner bag fabricated of durable impermeable media having an air-permeable particle separator and inlet: that can eliminate the need for backup filters and complicated seals between filtration stages, that is suitable for new vacuum cleaners as well as retrofitting existing vacuum cleaners; that can have a re-sealable vacuum cleaner bag opening for dumping contents of bag so that it may be reused; that offers an improved design that reduces incoming dirt velocity to improve filtration performance, that can feature an antimicrobial treatment, scenting and absorbent filter to reduce odors being emitted.

SUMMARY OF THE INVENTION

Accordingly, it is an object of the present invention to provide an improved vacuum cleaner bag and method of operation for a vacuum system such as a vacuum cleaner.

It is another object of the present invention to provide a vacuum cleaner bag to retrofit existing vacuum cleaners with a high efficiency filtration system.

Yet another object of the present invention is to reduce the cost of operating a vacuum cleaner by providing an effective reusable vacuum cleaner bag.

A further object of the present invention is to eliminate the need for costly backup filters and the seals between each filtration stage by providing a high efficiency, single-stage vacuum cleaner bag.

An additional object of the present invention is to provide a superior vacuum cleaner bag design that reduces the velocity of the dirt entering the bag to improve filtration efficiency and life expectancy of a vacuum cleaner bag.

A significant object of the present invention is to contain hazardous materials completely in the bag for safe disposal without operator exposure or vacuum cleaner contamination.

A still further object of the present invention is to provide a vacuum cleaner bag that solves the problem of odor in the vacuum cleaner.

It is another object of the present invention to provide a re-sealable vacuum cleaner bag open end.

Yet another object of the present invention is to provide a vacuum cleaner bag that has a translucent media for inspecting the contents of the bag so that it can be emptied at appropriate intervals to sustain peak performance and avoid overfilling.

It is one more object of the present invention to provide a durable bag construction that can collect sharp, heavy objects and liquids without breaking.

Still one more object of the present invention is to significantly reduce disposable, paper vacuum cleaner bag and back-up filter waste and bring a positive impact on the environment.

One more object of the present invention is to reduce the time consumers spend shopping for replacement vacuum cleaner bags.

Another object of the present invention is providing a method of collecting dirt in a vacuum cleaner wherein dirt is conveyed into a bag comprising durable impermeable media and dirt is retained in bag cavity by an air-permeable particle separator as clean air exits the bag.

DESCRIPTION OF FIGURES

FIG. 5 is a cross sectional view of the air-permeable particle separator shown in FIG. 1.

FIG. 6 is a back view of the air-permeable particle separator shown in FIG. 5.

FIGS. 23–28 are front views and side views of alternate embodiments of a vacuum cleaner bag in accordance with the present invention.

FIGS. 29, 31 and 33 are cross sectional side views of alternate embodiments of air-permeable particle separators in accordance with the present invention.

FIGS. 30, 32, and 34 are back views of alternate embodiments of air-permeable particle separators in accordance with the present invention.

REFERENCE NUMERALS IN DRAWINGS

Figure 1:
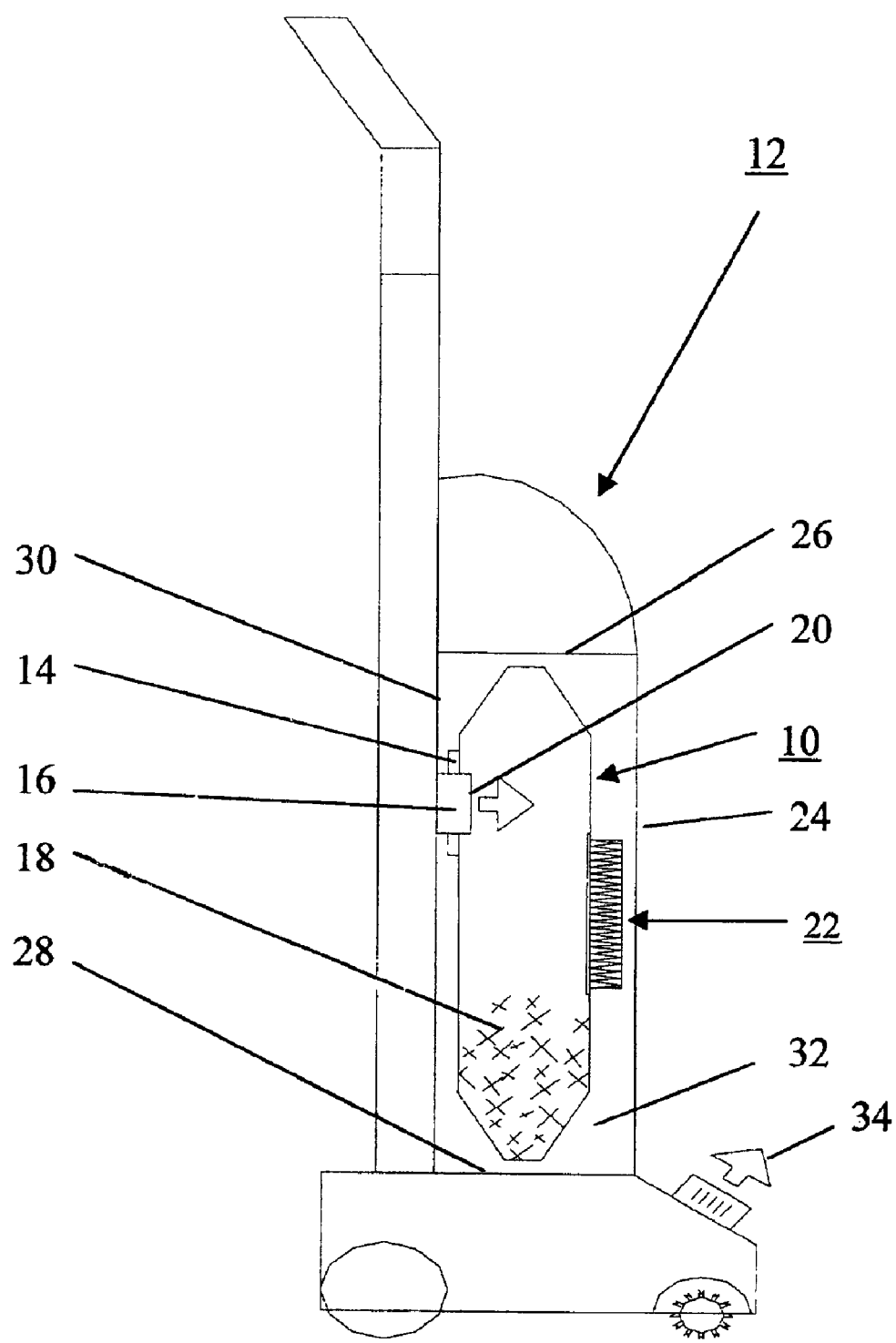
FIG. 1 is a cross-sectional side view of one embodiment of the present invention shown in an upright vacuum cleaner having a hard vacuum cleaner bag case.

10. Vacuum cleaner bag
12. Vacuum cleaner
14. Bag seal
16. Dirt tube
18. Dirt
20. Inlet
22. Air-permeable particle separator
24. Hard bag cover
26. Top cover seal
28. Bottom cover seal
30. Back cover seal
32. Clean air
34. Exhaust
36. Impermeable media
38. Cavity
40. Frame seal
42. Frame
43. Flat Media
44. Pleated media
46. Bag open end
48. Closure mechanism
50. Bag closed-end
52. Removable-top
54. Top-frame
56. Gasket
58. Bond
60. Permanent-bottom
62. Attached-lid frame
64. Hinge
66. Attached-lid
68. Lid gasket
70. Male snap closure
72. Female snap closure
74. Cover
76. Expanded PTFE membrane
78. Backer
80. Pre-filter
82. Incoming air flow
84. Soft bag
86. Top mount dirt tube -continued

REFERENCE NUMERALS IN DRAWINGS

88. Bottom mount dirt tube
90. Dirt tube o'ring
96. Slider
98. Interlocking parts
100. Male profile
102. Female profile
104. Front bag sheet
106. Back bag sheet
108. First-end
110. Second-end
112. Slider front
114. Slider back
116. End clamps
118. Front profile track
120. Back profile track
122. Transparent window
124. Opaque impermeable media

DESCRIPTION OF INVENTION

This application claims priority of U.S. application Ser. No. 09/847,808, filed May 2, 2001, which claims benefit of U.S. Provisional application No. 60/201,654, filed May 3, 2000. In addition, this application claims benefit of U.S. Provisional application No. 60/268,183, filed Feb. 13, 2001.

A typical embodiment of a vacuum cleaner bag 10 of the present invention is shown in side view in FIG. 1 when installed in an upright vacuum cleaner 12. The vacuum cleaner bag connects to the vacuum cleaner by a bag seal 14 on a dirt tube 16 in an essentially leak-proof manner. A dirt 18 is pneumatically conveyed or pumped into the bag through an inlet 20. The dirt is normally in the form of dust, allergens, hair, carpet fiber, lint, soil, grass, leaves, wood chips, sand, liquids and other contamination. The air that pneumatically conveys the dirt into the vacuum cleaner bag enters the bag through the inlet and exits the vacuum cleaner bag through an air-permeable particle separator 22. A clean air 32 exits the vacuum cleaner through an exhaust 34.

The conveying air can be either pushed or pulled through the bag depending on the location of the suction unit (not shown) relative to the bag. A hard bag cover 24 generally attaches to the vacuum cleaner at a top cover seal 26, bottom cover seal 28, and a back cover seal 30. In appliances where the suction unit is pulling air through the bag, the clean air may flow through the suction unit before being exhausted from the vacuum cleaner. The clean air provided extends the life of the motor driving the suction unit by avoiding particulate contamination.

Bag seal 14 can be comprised of any material that will retain a snug, airtight fit against dirt tube 16 over time. Suitable materials are elastomeric such as urethane, vinyl, plasticized PVC, dense foam, rubber, nitrile, plastics, cellulose, dense cardboard or a combination of the preceding materials. The bag seal can be adapted with a closure (not shown) to prevent dirt 18 from exiting the bag during removal from the vacuum cleaner and while handling.

Figure 2:
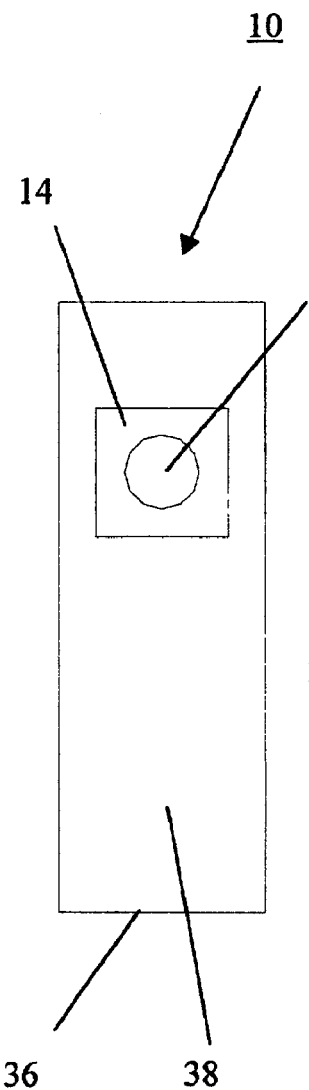
FIG. 2 is a front view of the vacuum cleaner bag shown in FIG. 1.
Figure 3:
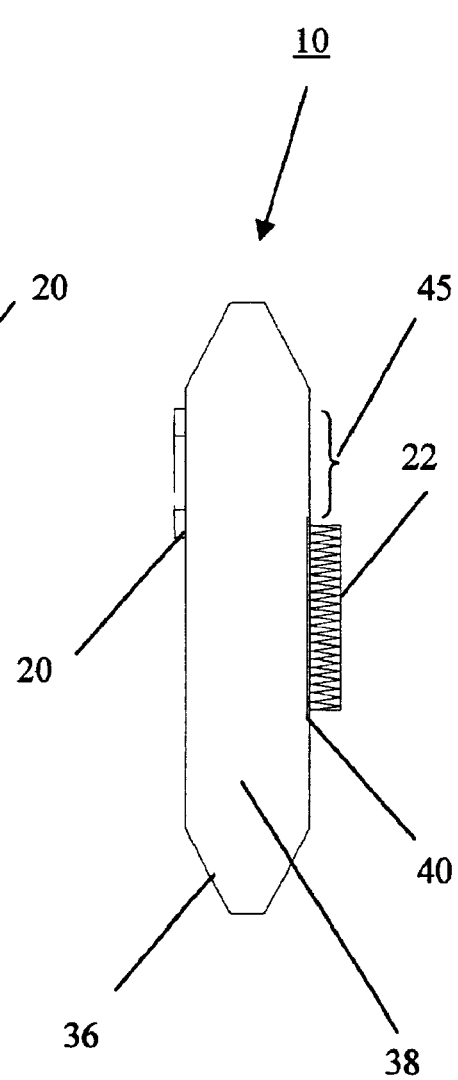
FIG. 3 is a cross sectional side view of the vacuum cleaner bag shown in FIG. 1.
Figure 4:
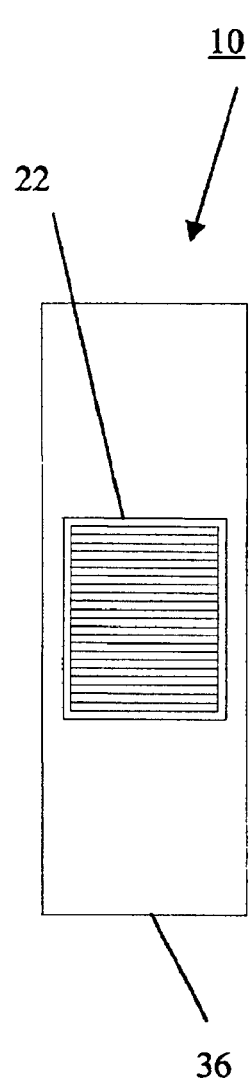
FIG. 4 is a back view of the vacuum cleaner bag shown in FIG. 1.

The vacuum cleaner bag of the present invention is shown in front view in FIG. 2, side view in FIG. 3, and back view in FIG. 4. The bag is formed of an impermeable media 36 having an interior cavity 38 for storing the dirt. Suitable impermeable medias include any durable film that essentially prevents airflow such as polyethylene, polypropylene, vinyl, nylon, coated fabric, coated paper, or other natural or synthetic materials. The thickness of the impermeable media can vary from a completely flexible material that allows inflation of the bag under use to a rigid material that has a firm shape that does not change during usage.

The impermeable media can include antimicrobial treatments to inhibit the growth of bacteria and mold in the bag. Antimirobial treatments are available from Microban Products Company, Huntersville, N.C. Antimicrobial treatments are incorporated by a coating on the impermeable media or by compounding the additives into the resin used to produce the impermeable media. Furthermore, the impermeable media can be manufactured of translucent material so that the contents of the bag can be inspected without opening. The impermeable media can also be optionally treated or processed to increase its adhesion properties for attaching bag seal 14 and air-permeable particle separator 22.

To prevent the buildup of static electricity on the vacuum cleaner bag of the present invention, impermeable media 36 can be further comprised of an anti-static coating. Alternate static electricity controls could include a metallic fiber integrated into impermeable media 36 or conductive fillers compounded into resin producing the impermeable media.

Referring to FIGS. 3 and 4, the air-permeable particle separator 22 is connected to impermeable media 36 over an exit hole (not shown) in the vacuum cleaner bag in an essentially leak-proof manner using a frame seal 40. The seal surrounds the perimeter of the air-permeable particle separator and closes the gap between the air-particle separator and the impermeable media. The seal can be achieved by heat fusion, adhesives, ultrasonic welding, chemical bond or other methods known by those skilled in the art of sealing.

Impermeable media 36 can be further adapted to be colored or tinted to help differentiate between different sizes, quality and brands of bags. The surface of the impermeable media can also be printed with text and figures. Impermeable media can be additionally modified through embossing or thermoforming or the like to provide shape to its surface for unique identification or structural reinforcement.

Referring to FIGS. 5 and 6, air-permeable particle separator 22 is comprised of a frame 42 wherein a pleated media 44 is installed in an essentially leak proof manner. Suitable materials for producing the frame include cardboard and plastic materials such as ABS, polycarbonate, polyethylene, polypropylene and so on. The pleated filter media is sealed into the frame using heat fusion, ultrasonic welding or adhesives such as hot melt glue or polyurethane, for example. Generally flat media is pleated or folded to increase the area of media installed in a constrained space. In some applications it is necessary to separate the pleats with glue beads (not shown) as known by those skilled in the art of pleating. The glue beads keep the pleats open when under load from the airflow. The pleats can be in a variety of configurations such as triangular, curved, square, etc.

By employing pleated media, the present invention allows designers to vary the amount of media used in air-permeable particle separator 22. Thus, when designers use less permeable, high efficiency media they have the flexibility to increase the surface area of the air-permeable particle separator so that an airflow restriction is not a consequence. As previously noted, conventional vacuum cleaner bag designs limit media area to the surface of the bag. If it is desirable to add media the bag has to be made larger which most likely will not fit in the vacuum cleaner housing.

As shown in FIG. 3, air-permeable particle separator 22 ideally is positioned so that the airflow-containing dirt entering the inlet does not directly impinge on the air-permeable particle separator. Positioning the air-permeable separator away from the inlet allows the dirt particles to impact the opposite interior impermeable wall of the bag, lose velocity and circulate in the bag so that the air-permeable particle separator has maximum filtration effectiveness and experiences minimum damage. For maximum performance, air-permeable particle separator is generally not positioned in an impact zone. In bag designs requiring high efficiency filtration, air-permeable particle separators positioned in impact zone 45 can be protected by a shield (not shown) to deflect high velocity dirt. A shield can be any object that prevents high velocity dirt from directly impacting pleated media 44.

Suitable filtration materials that can be used in the air-permeable particle separator of the present invention are any materials that separate dirt from the conveying air such as, but not limited to, expanded polytetrafluoroethylene (PTFE) membrane, microporous foams, cellulose paper, cellulose/synthetic fiber paper blends, electrostatically charged media, paper, membrane, microfiberglass, nonwovens, fabrics, felt, microporous solids or combinations of, for example. Pleated media 44 is optionally adapted antimicrobial, hydrophobic or non-stick. Suitable (PTFE) membrane is available from W.L. Gore & Associates, Inc., Newark, Del. under the brand name GORE-TEX® or equivalent.

Figure 7:
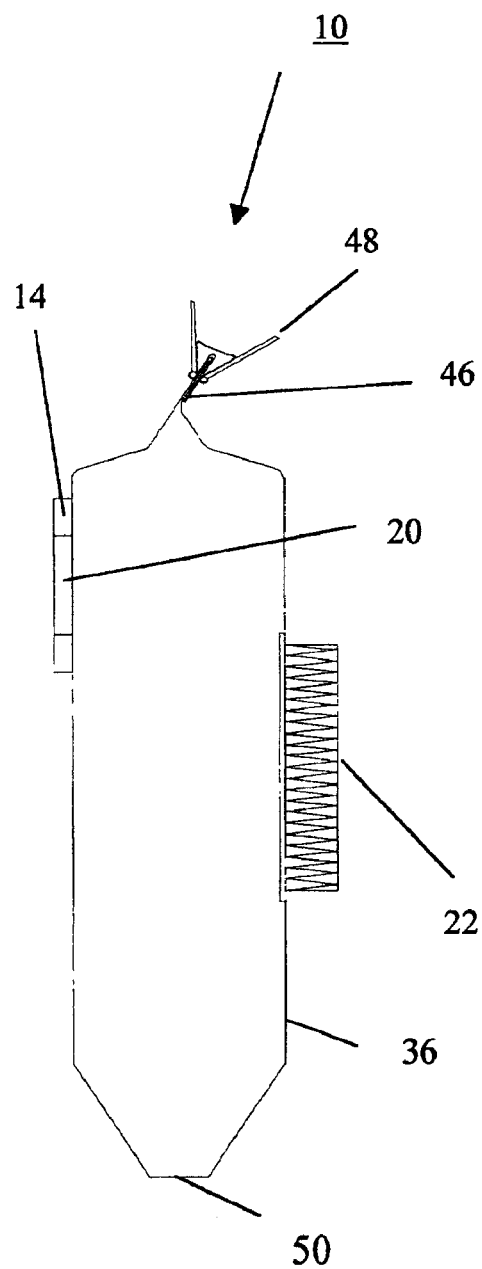
FIG. 7 is a cross sectional side view of an alternate embodiment of a vacuum cleaner bag with an opening for emptying contents in accordance with the present invention.
Figure 8:
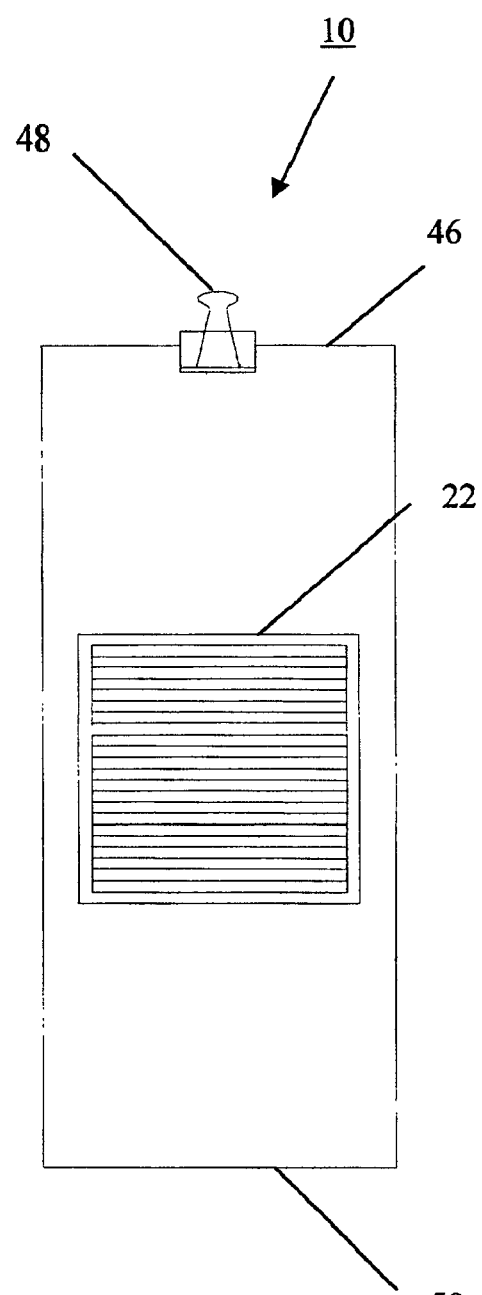
FIG. 8 is a back view of the alternate embodiment shown in FIG. 7.

FIG. 7 shows one embodiment of the present invention in side view having a bag open-end 46 secured shut with a closure mechanism 48. As shown impermeable media 36 at the open-end is folded over at least once and the folds prevent pressurized air inside the bag from leaking out, especially when containing dirt. The closure mechanism prevents the folds from opening and allowing pressurized air to escape. The closure mechanism consists of a clamp that applies pressure on the fold to prevent opening. The clamp can be spring-loaded for added security.

Sealing and resealing the impermeable media can be achieved in many ways. Suitable open-end designs that are re-sealable can include, for example, interlocking plastic or elastic parts, threaded lids, or lids with interference fit with the bag opening.

Figure 9:
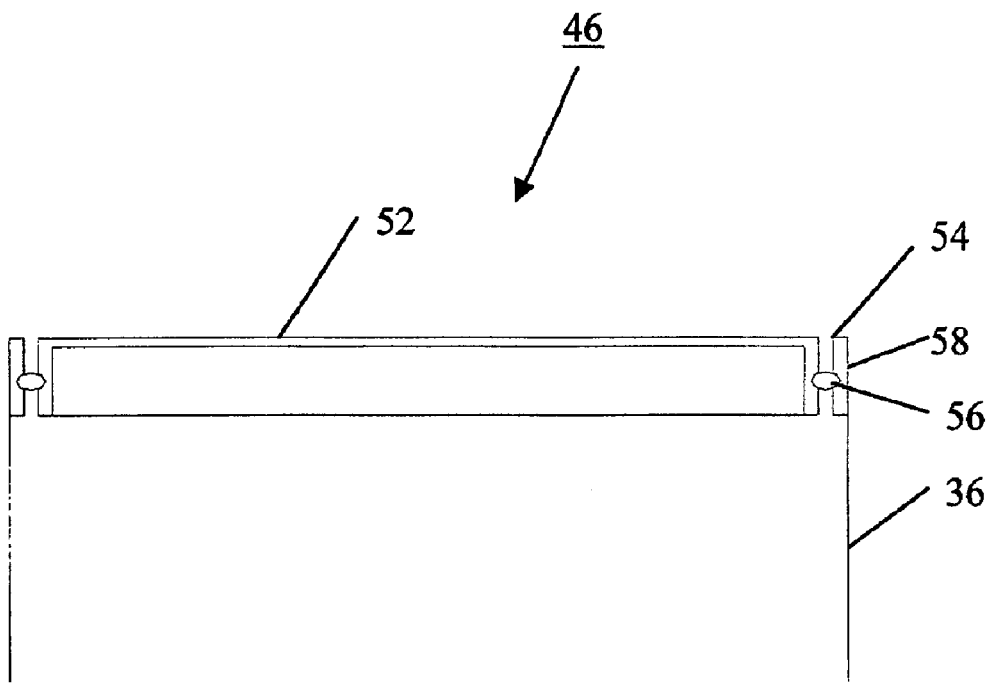
FIG. 9 is a cross sectional view of an alternate embodiment of a vacuum cleaner bag opening for emptying the contents in accordance with the present invention.

FIG. 9 shows in a cross sectional side view a second embodiment of the bag open-end 46. A removable-top 52 is inserted in a top-frame 54 with a gasket 56 that closes the gap between the two components in an essentially leak-proof manner. The removable-top and top-frame are generally injection-molded components manufactured from thermoplastic materials, for example, polyethylene, ABS, polypropylene, etc. Cardboard or the like can also be utilized in lower life expectancy designs. Suitable gasket materials include any elastomeric material that will retain its resilient conformable properties over time such rubber, urethane, nitrile, foam, etc. A bond 58 seals impermeable media 36 to top-frame 54 in essentially a leak-proof manner. Acceptable bonds of the present invention are realized through a variety of techniques including heat fusion, adhesives, chemical bonding, etc.

Figure 11:
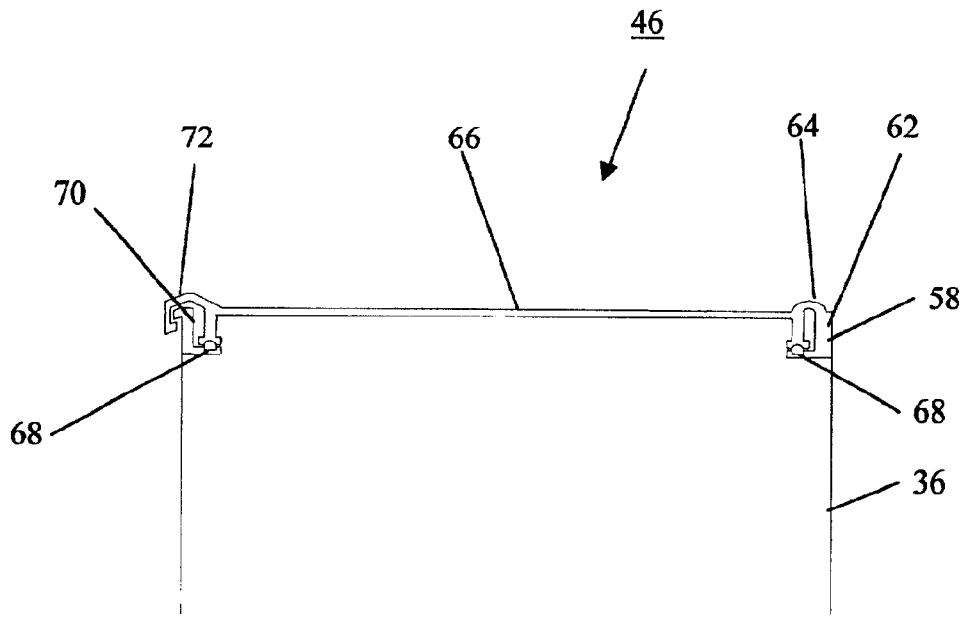
FIG. 11 is a cross sectional view of a alternate embodiment of a vacuum cleaner bag opening for emptying the contents in accordance with the present invention.
Figure 12:
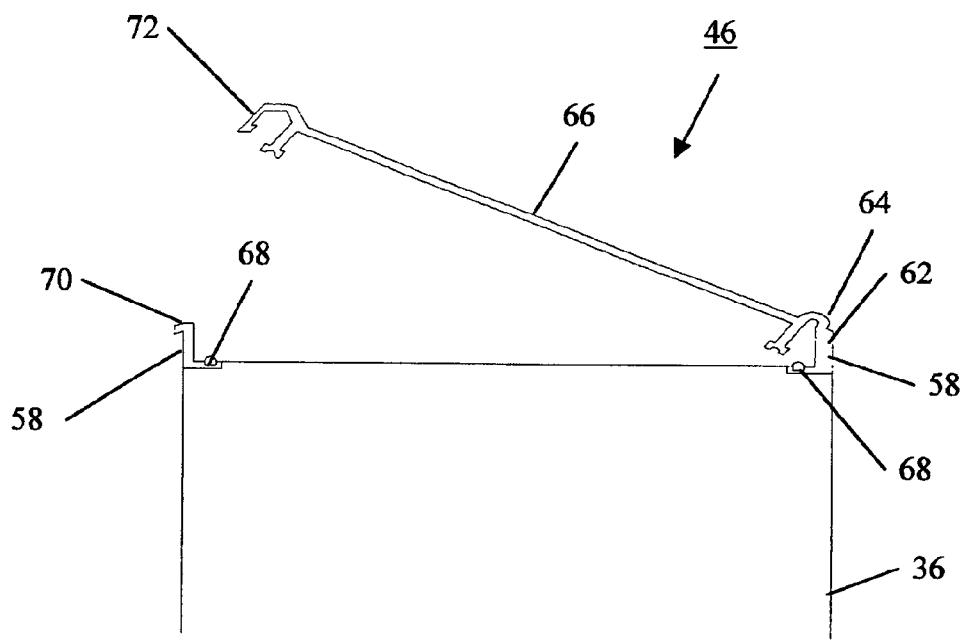
FIG. 12 is a cross sectional view of the vacuum cleaner bag opening shown in FIG. 11 in open position.

FIG. 11 shows a third alternate bag open-end 46 of vacuum cleaner bag 10 of the present invention. Attached-lid 66 is connected to attached-lid 62 on one end by hinge 64. The other end of the lid attaches by a male snap closure 70 interlocking with a female snap closure 72. A handle (not shown) can be added to facilitate the opening and closing of lid. A lid-gasket 68 seals the gap between attached-lid 66 and attached-lid frame 62 in an essentially leak-proof manner. As shown, lid-gasket 68 is a foam-in-place gasket normally produced of urethane. Other suitable gaskets include plasticized PVC, foam, rubber, etc. Many configurations of seals known by those skilled in the art of sealing can be employed within the scope of the present invention. FIG. 12 shows the same bag open-end 46 of vacuum cleaner bag 10 in open position.

Figure 13:
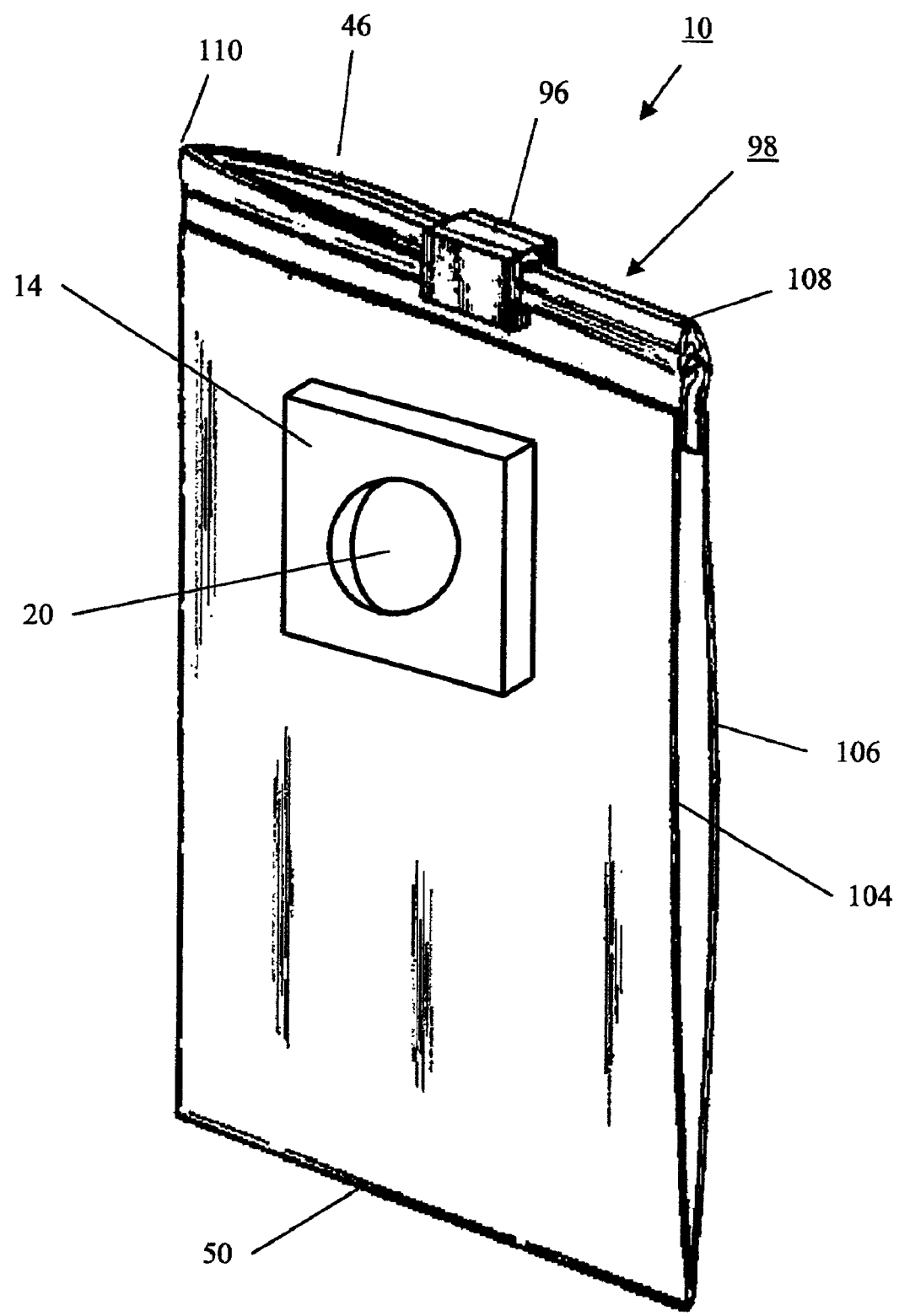
FIG. 13 is a perspective front view of a reusable vacuum collection bag of the present invention having a slider assembled on interlocking parts at the open end of the bag.
Figure 14:
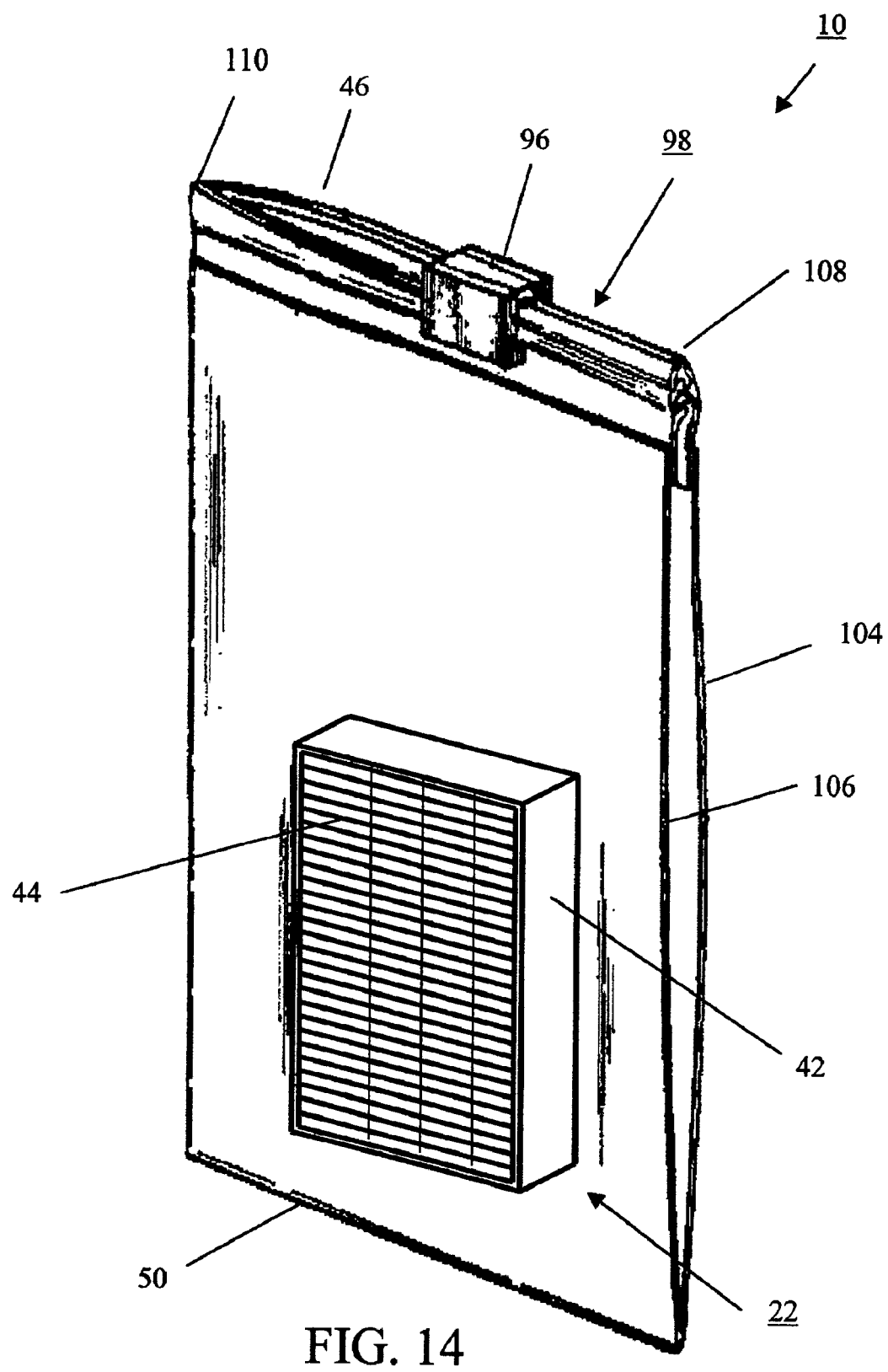
FIG. 14 is a perspective back view of the reusable vacuum collection bag shown in FIG. 13.

FIGS. 13 and 14 show a fourth embodiment of the present invention in front and back perspective views, respectively. A bag open-end 46 is adapted with a pair of complementary interlocking parts 98 for sealing the bag open-end closed. Interlocking parts 98 are also referred to as rolling action zippers, reclosable fasteners, interlocking elements, interlocking ribs and grooves, flexible fastener tracks, sliding clasp fasteners, profiled strip fasteners, and so on by those skilled in the art of manufacturing reclosable bags. Also shown is an optional straddling slider 96 that facilitates opening and closing the bag.

Figure 15:
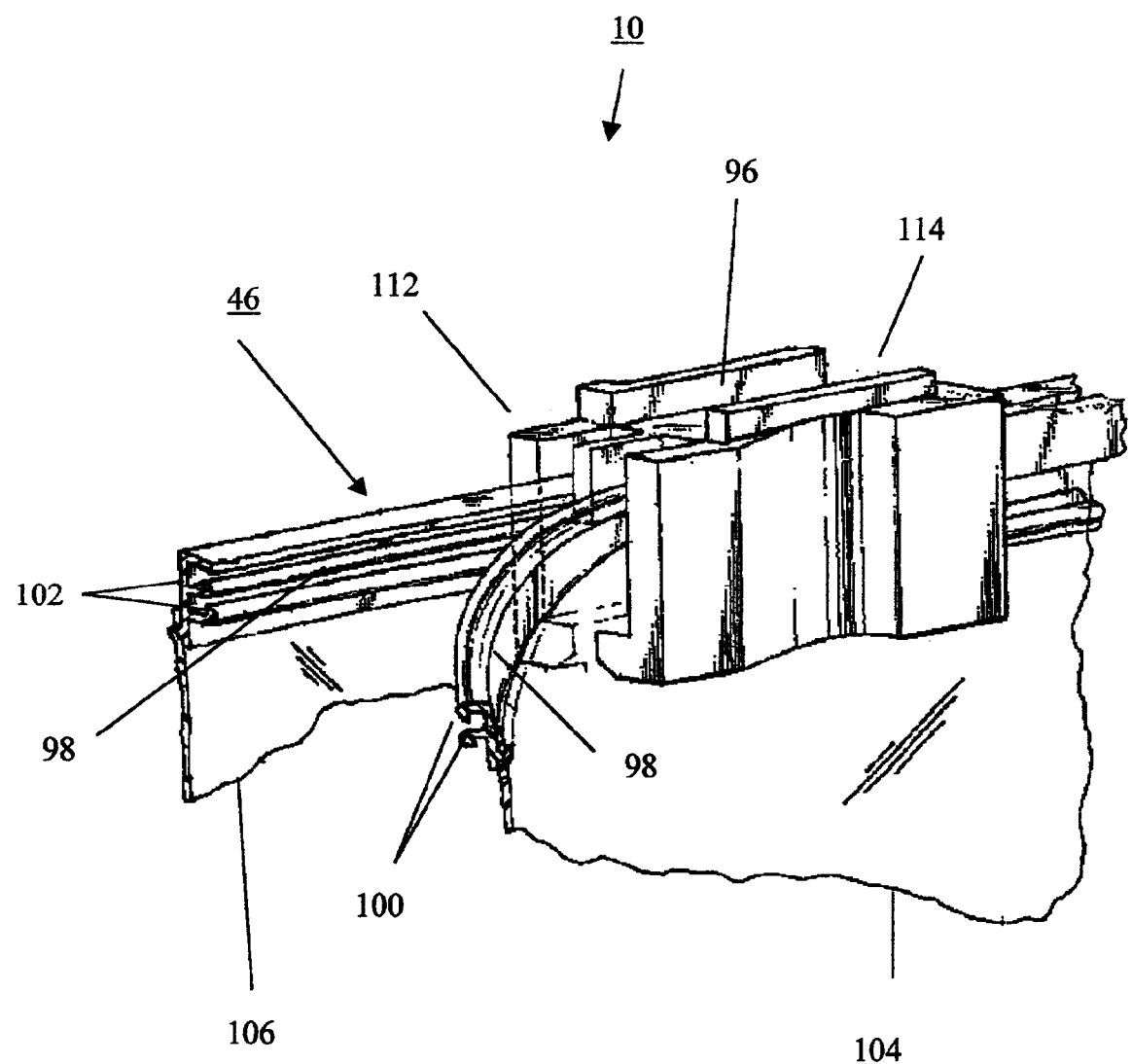
FIG. 15 is an enlarged scale perspective front view of one embodiment of the open-end of the vacuum collection bag of the present invention.

Referring to FIG. 15 one embodiment of the interlocking parts 98 are comprised of a male profile 100 extending the inside width of a front bag sheet 104 at the bag open-end 46 and a female profile 102 extending the inside of a back bag sheet 106 at the bag open-end 46. These profiles can be reversed so that the male profile is located on the back bag sheet and the female profile is located on the front bag sheet. The present invention can employ a plurality of rows of interlocking parts with the position of the mating male and female profiles able to alternate randomly in orientation.

The male and female profiles are generally flexible and can have any shape that provides an essentially leak-proof seal in-use that can be closed, opened and resealed. As shown in FIG. 14, they are typically engaged by interlocking the profiles at a first-end 108 of the bag open-end and sliding pressure along the interlocking parts to a second-end 110 of the bag open-end thereby creating an essentially leak-proof closure of the bag. The interlocking parts can be an integral part of the bag or attached to the bag in a secondary operation as known by those skilled in the art. The bag of the present invention generally can be opened and closed numerous times. Opening the bag of the present invention is usually achieved by separating the interlocking parts at the second-end 110 of the mouth of the bag and pealing the interlocking parts apart across the entire width of the bag open-end.

Figure 16:
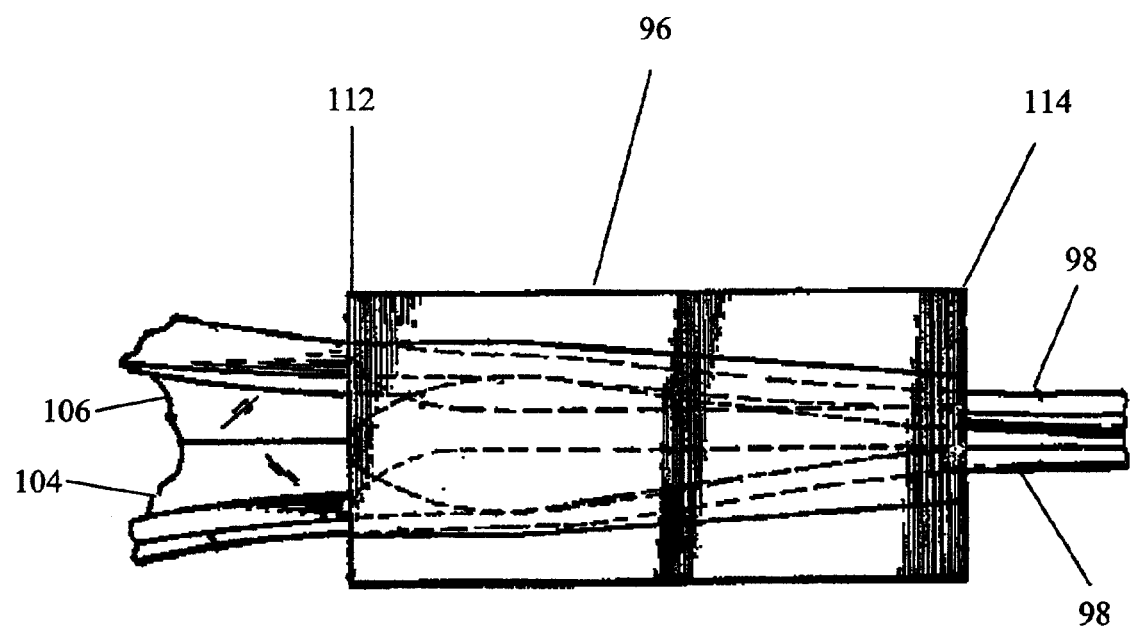
FIG. 16 is a top plan view on an enlarged scale of one embodiment of slider.

As shown in FIG. 16, one embodiment of slider 96 of the present invention is essentially an inverted U-shape member that is adapted for assembly with the interlocking parts 98. It is normally manufactured from plastic but it could be manufactured from metal or materials capable of holding a desirable shape. It can be manufactured of one-piece construction, multiple parts that are subsequently assembled, or of foldable elements. Used in conjunction with interlocking parts 98 located on the front sheet 104 and back sheet 106 of the bag open-end allows closing the bag by passing the slider along the interlocking parts from first-end 108 to second-end 110. Thus opening the bag is achieved by reversing the slider direction. Typically the design of the slider is such that it holds open the interlocking parts at a slider front 112 and it closes the profiles at a slider back 114 as it passes by. The interlocking parts and slider can be further adapted to provide a track for guiding the slider across the width of the bag or to orient the sealing profiles.

Figure 17:
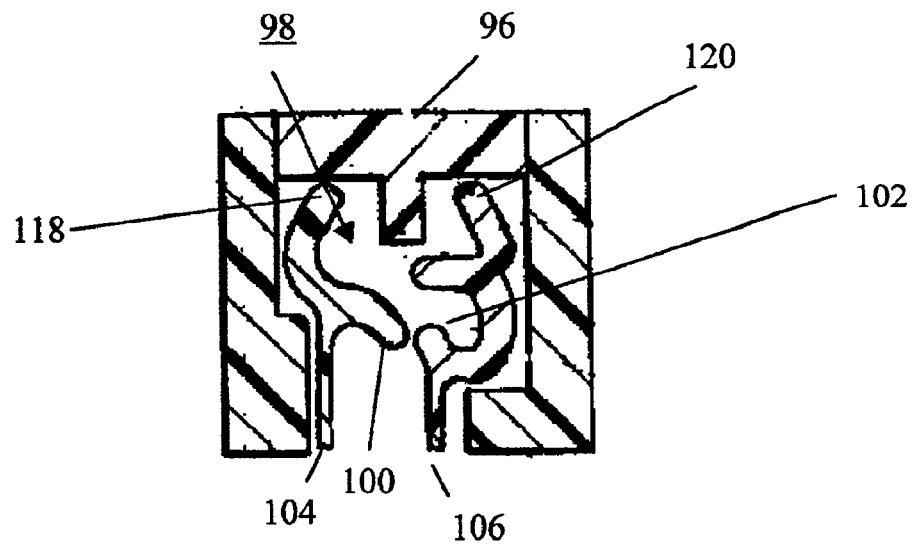
FIG. 17 is a cross sectional view of a second embodiment of interlocking parts and slider on bag open end with slider positioned at first end of a bag of present invention.
Figure 18:
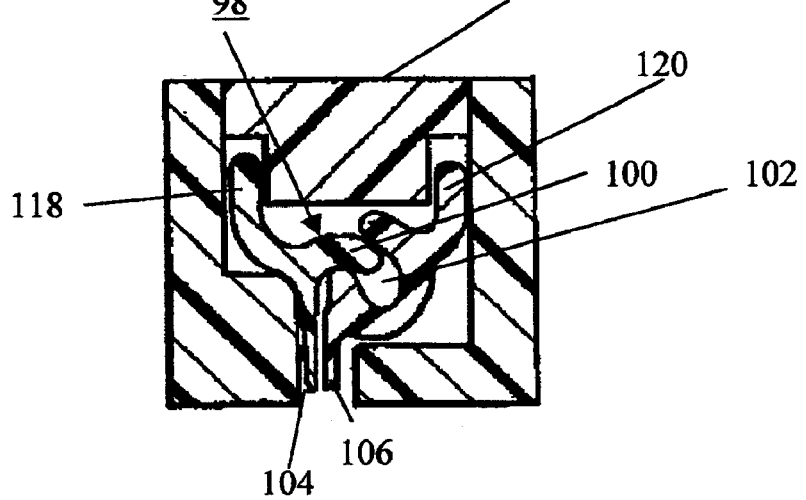
FIG. 18 is a cross sectional view of the slider shown in FIG. 17 with male profile partially engaged in female profile.
Figure 19:
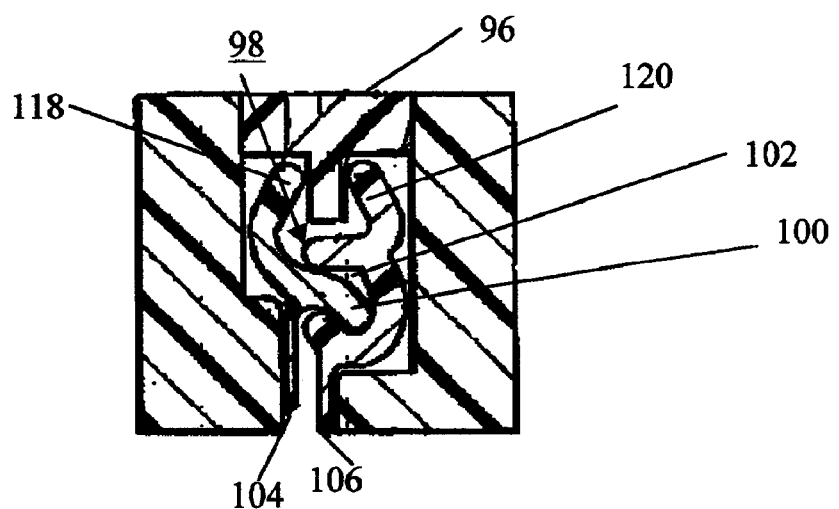
FIG. 19 is a cross sectional view of the slider shown in FIG. 17 with the male profile fully engaged in female profile.

FIG. 17 illustrates in a cross sectional view a second embodiment of interlocking parts 98 with slider 96 with the bag open. In this embodiment the slider 96 plays an important role in orienting the male and female profiles for engagement. As shown in FIG. 18, the slider 96 separates a front profile track 118 and a back profile track 120 so that the male profile 100 aligns with female profile 102 for engagement. As the slider 96 moves from the first-end 108 to the second-end 110 it presses the male and female profiles together first, then presses the top tracks together as it passes by. FIG. 19 shows the relationship of the male and female profiles and front and back profile tracks subsequent to passing the slider 96 from first-end 108 to second-end 110 thereby essentially closing the bag open-end 46. Moving the position of the slider from second-end 110 to first-end 108 opens the bag.

Figure 20:
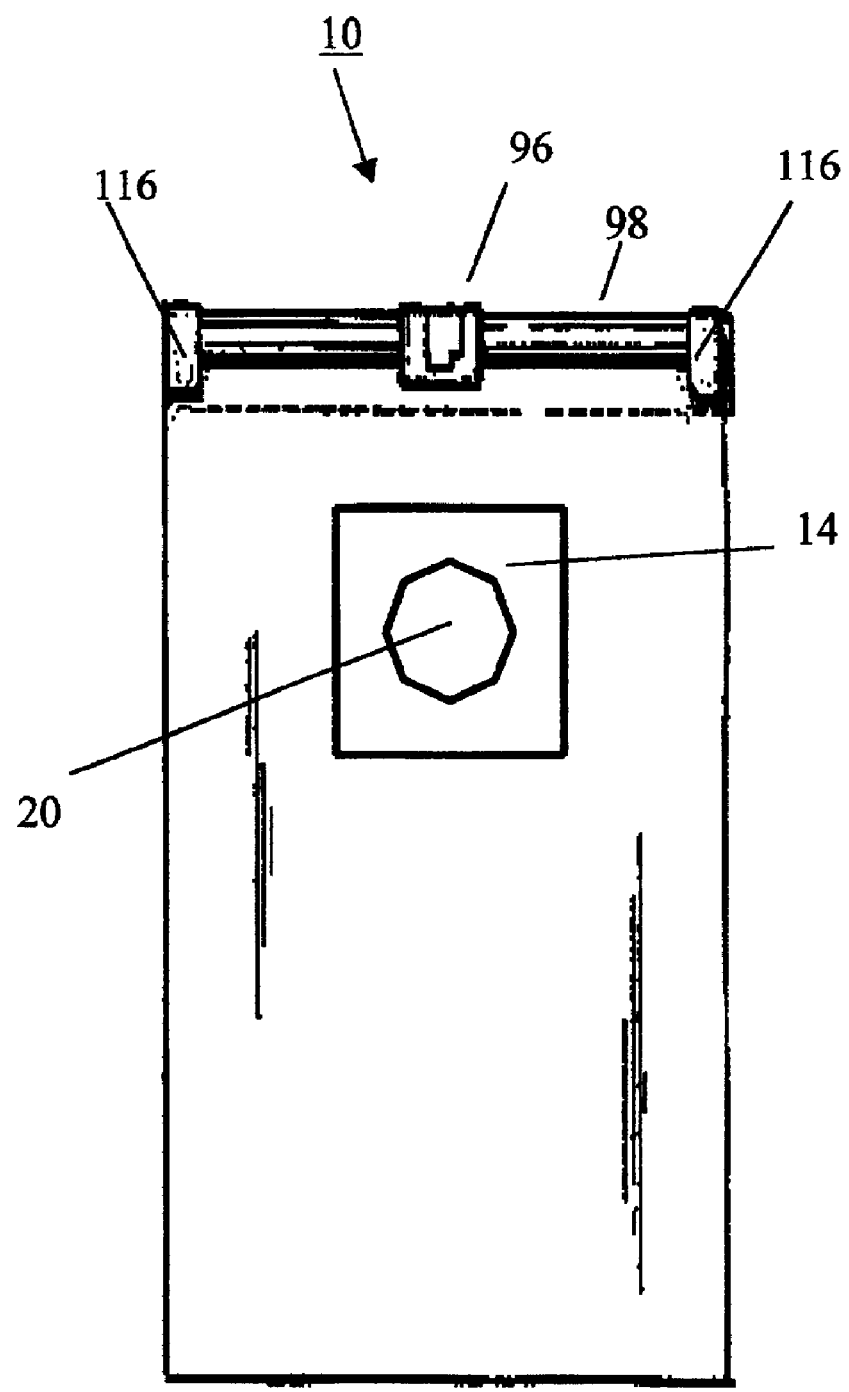
FIG. 20 is a front view of the vacuum cleaner bag of the present invention displaying end-clamps.

FIG. 20 shows the reusable vacuum collection bag of the present invention having end clamp stops 116 installed at both sides of the bag open-end. In this embodiment the end clamp stops hold the two interlocking parts 98 firmly together and also stop the slider from going past the ends of the bag. Clamps consisting of plastic members which sandwich the interlocking parts in between generally form the end clamp stops. Typically rivets secure the end clamp stops to the bag. The end clamp stops can also feature a detent to provide the user a positive signal that the bag open-end is closed. A second embodiment involves staking the two ends by heat or ultrasonic fusion to reinforce the bag ends. End clamps can also facilitate achieving a leak proof seal.

The interlocking parts and sliders can take on various configurations as known by those skilled in the art. U.S. Pat. Nos. 5,664,299 and 5,007,143 and the like, including improvements upon, are examples of designs that would be suitable for the present invention.

Referring to FIGS. 2–4, a bag closed-end 50 is formed in a variety of ways known by those skilled in the art of making bags. For example, a sheet of impermeable media can be folded in half horizontally and the two vertical edges can be sealed. Or impermeable media sheet can be formed into a tube and one vertical edge can be sealed along with the bottom edge. Another possibility is to extrude a tube and seal the bottom edge closed. One more possibility is to form a bag through injection molding. Edges of bags are generally closed with adhesive, heat fusion, crimping, embossing and so on. The sides of bag can be pleated or folded to increase the interior cavity's holding capacity. The inside surface of bag can be treated to be nonstick to facilitate emptying.

Figure 10:
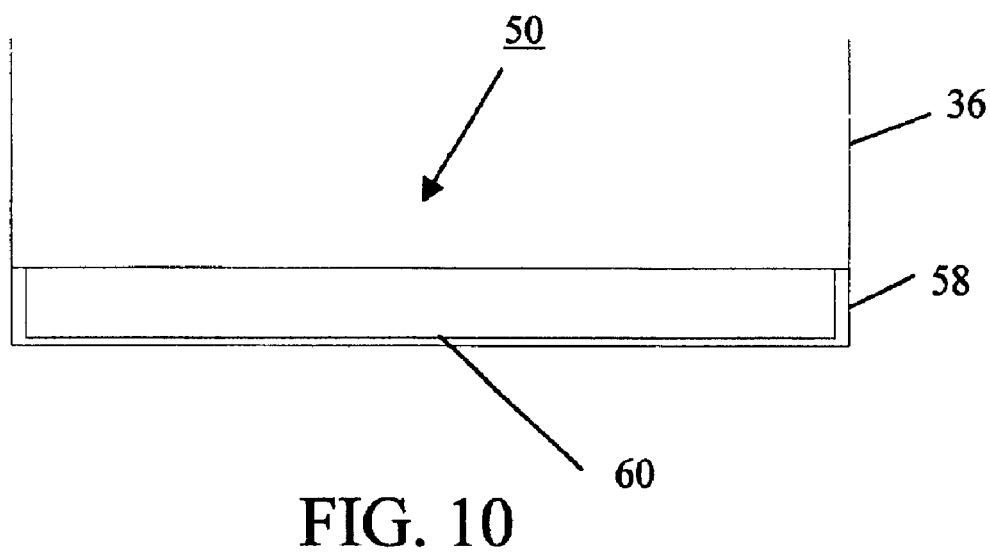
FIG. 10 is a cross sectional view of an alternate embodiment of a vacuum cleaner bag closed bottom in accordance with the present invention.

FIG. 10 shows in a cross sectional side view a second embodiment of bag closed-end 50. A permanent-bottom 60 is sealed to impermeable-media 36 in an essentially leak-proof manner with bond 58. Suitable permanent-bottom materials are injection-molded plastic or cardboard.

Figure 21:
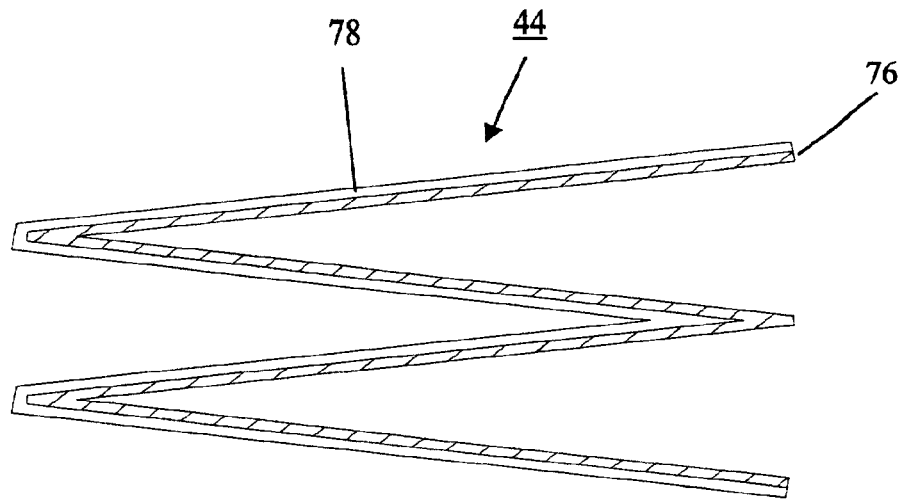
FIG. 21 is a cross sectional view of one embodiment of pleated filter media in accordance with the present invention.

FIG. 21 shows in a cross-sectional side view of one high efficiency embodiment of pleated media 44. In this embodiment, the pleated filter media is comprised of a two-layer laminate comprising an expanded polytetrafluoroethylene (PTFE) membrane 76 and a backer 78. Generally the airflow-carrying dirt contacts the expanded PTFE membrane before flowing through the generally more porous backer. The backer provides support to the very thin expanded PTFE membrane. For additional strength, the expanded PTFE membrane is optionally attached to the backer. Suitable backers are sheets of porous polyester, nylon, paper, paper/synthetic blends, polypropylene, etc. Attaching the backer to the expanded PTFE membrane introduces the tradeoff of reduced permeability.

High efficiency expanded PTFE media in the present invention preferably is greater than 90% efficient at 0.3 microns when tested at airflows normally experienced in a vacuum cleaner. Those vacuum cleaner bags meeting HEPA standards would employ expanded PTFE media rated at 99.97% at 0.3 microns. Low to medium efficiency vacuum cleaner bags of the present invention employing PTFE membrane media would generally be in the less than 90% efficiency range at the same conditions. Microfiberglass, electrostatic medias and the like are other embodiments that can under certain conditions also provide HEPA filtration efficiency for reusable vacuum cleaner bags of the present invention. Expanded PTFE, microfiberglass and electrostatic medias can also be adapted to provided ULPA filtration performance.

Some cover 74 and backer 78 materials made of nonwoven contain two polymers such as polyethylene and polypropylene wherein the lower melting point of one of the polymers is used to adhere the layers together in lamination.

Once again referring to FIG. 1, it is important to understand that when the present invention employs high efficiency pleated media 44 in combination with leak-proof bag seal 14, that it is unnecessary to seal hard bag cover 24 to vacuum cleaner 12 so that airflow is channeled to a backup filter. The airflow is sufficiently cleaned in the vacuum cleaner bag of the present invention and therefore does not require additional filtration. Moreover, its durable construction eliminates the problem of bag breakage and hence backup filters are not required to protect the motor driving suction unit. This greatly simplifies vacuum cleaner designs thus eliminating the need for expensive backup filters and seals between filtration stages. Furthermore, it allows consumers to retrofit existing vacuum cleaners with a high efficiency filtration system.

Figure 22:
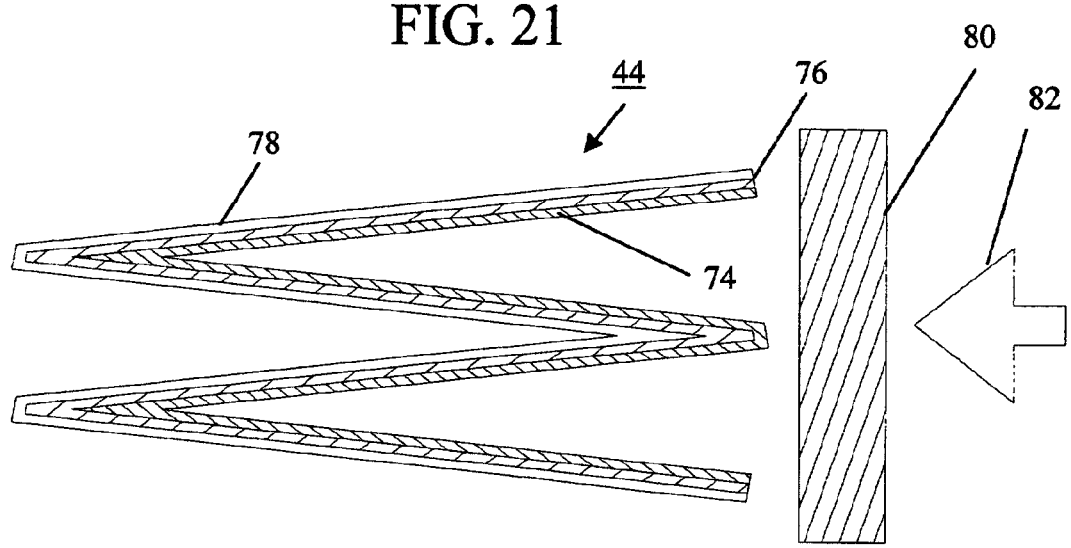
FIG. 22 is a cross sectional view of an alternate pleated filter media having a cover and pre-filter in accordance with the present invention.

FIG. 22 shows in a cross-sectional side view another embodiment of pleated filter media with a pre-filter 80 positioned between an incoming airflow 82 and pleated media 44. The pre-filter provides multiple functions including preventing large dirt from entering the pleats and/or eliminating odor by optionally utilizing activated charcoal, and/or providing a scent via odorant imbibed gel, plastic, foam, netting etc to air exiting the vacuum cleaner.

It should be understood that the vacuum cleaner bag in the present invention could be constructed in a variety of ways. For instance, as shown in FIGS. 23–28, the air-permeable particle separator can be installed over holes having a variety of locations relative to vacuum cleaner bag inlet 20. FIG. 23 shows air-permeable particle separator 22 installed in the front of the bag; FIG. 24 shows air-permeable particle separator 22 installed in the top of the bag; FIG. 25 shows air-permeable particle separator 22 installed in the bottom of the bag; and FIGS. 26–28 show air-permeable particle separator 22 installed on the side or sides of the bag.

The air-permeable particle separator can take on an infinite variety of geometric shapes of which a few examples are illustrated. FIG. 29 shows a side view of circular shaped air-permeable particle separator 22 and FIG. 30 shows a back view of the same circular shaped air-permeable particle separator. FIG. 31 shows a side view of an oval shaped air-permeable particle separator and FIG. 32 shows a back view of the same oval shaped air-permeable particle separator. FIG. 33 shows a side view of rectangular or square air-permeable particle separator having a flat media 43 instead of pleated media 44. FIG. 34 shows a back view of the same rectangular or square air-permeable particle separator having the flat media 43 installed in an essentially leak-proof manner in frame 42. Suitable air-permeable particle separators can also be, for example, flat panel (as shown), curved panel (not shown) or a round cylindrical cartridge (not shown), etc. Economical designs eliminate the frame and seal the filter media directly to the impermeable media. Air-permeable separator 22 can also be adapted to be replaceable.

Figure 35:
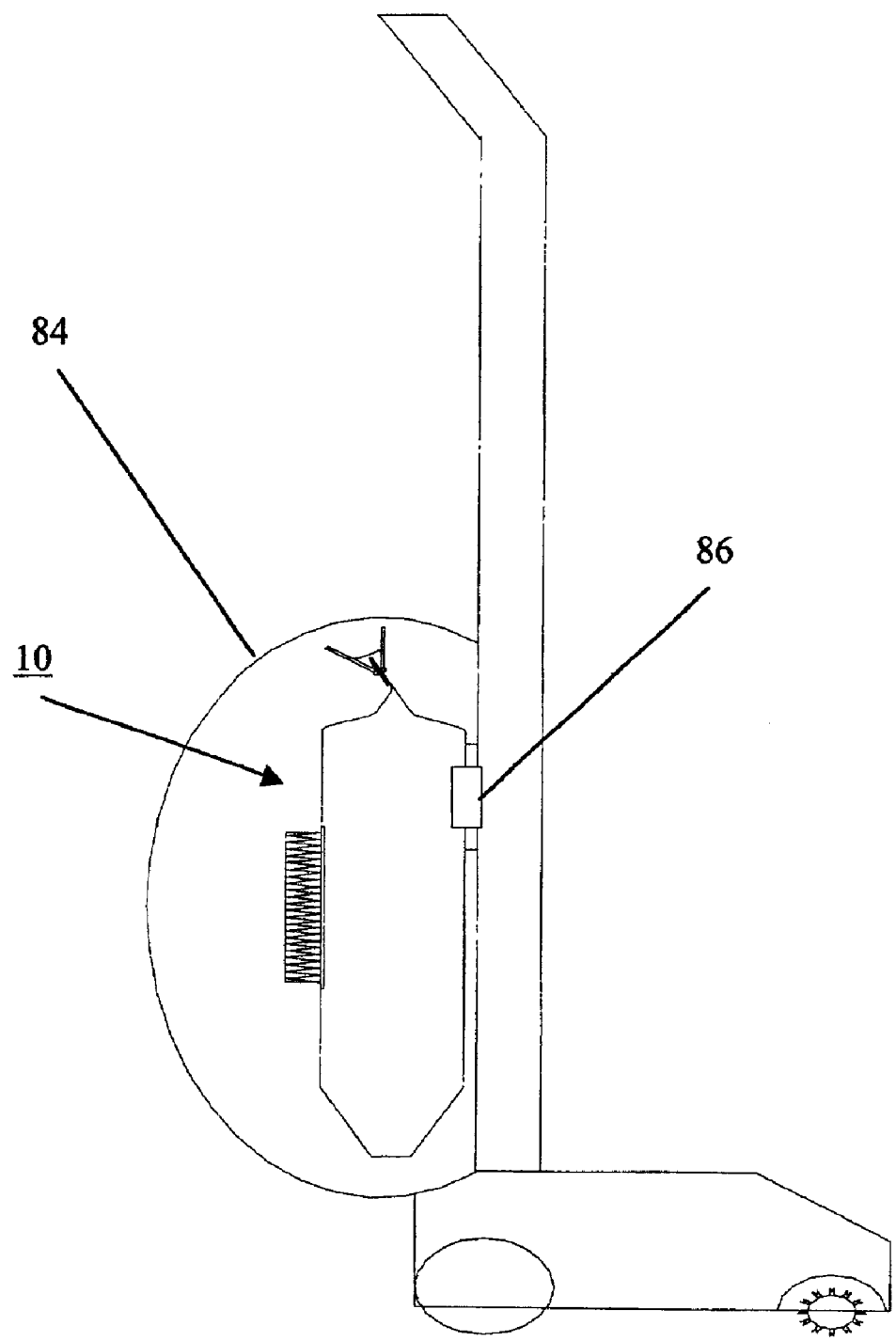
FIG. 35 is a partial cross-sectional side view of an alternate embodiment of the present invention shown in an upright vacuum cleaner having a soft case having a high inlet.
Figure 36:
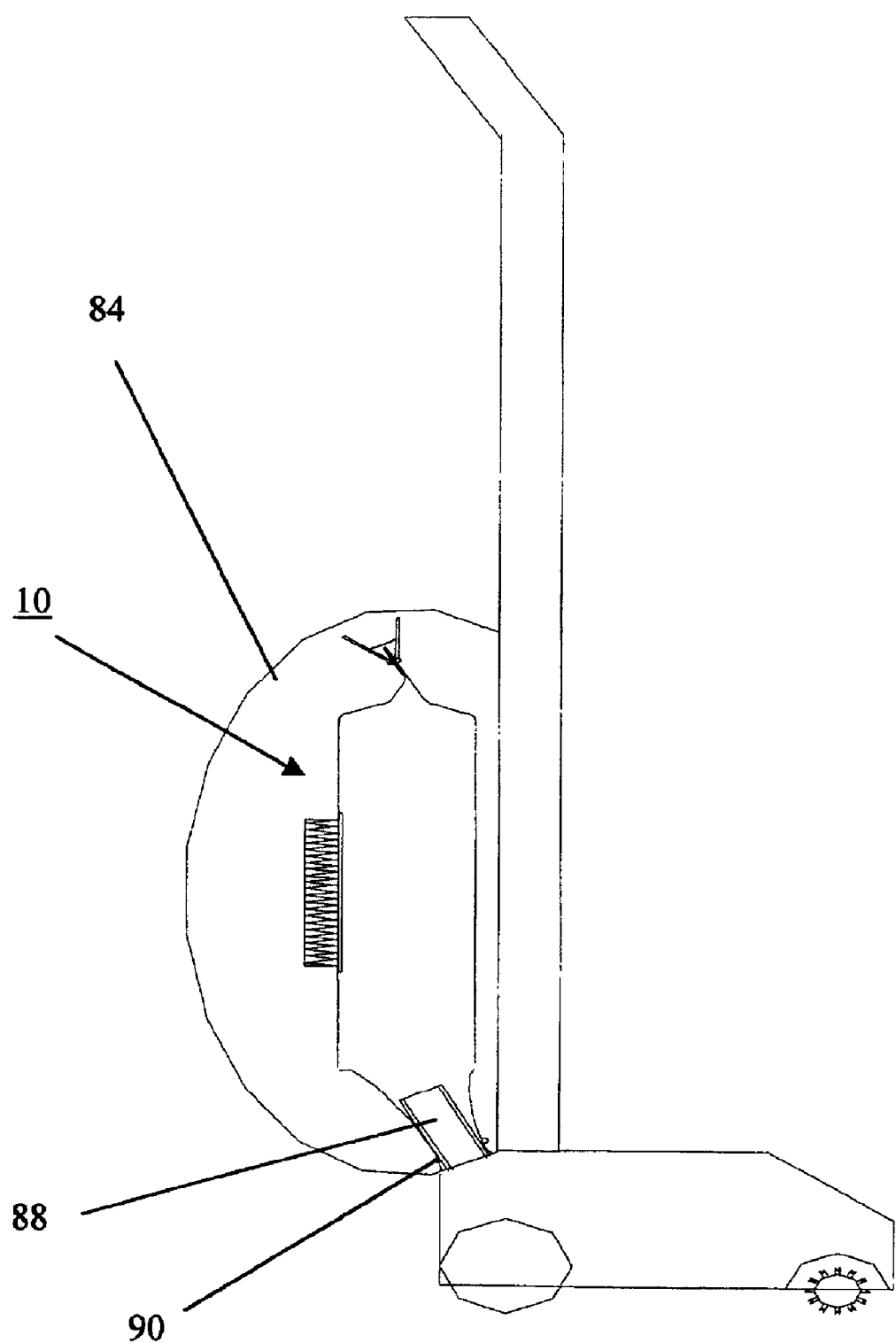
FIG. 36 is a partial cross-sectional side view of an alternate embodiment of the present invention shown in an upright vacuum cleaner having a soft case having a low inlet.

FIG. 35 shows in a cross-sectional side view the vacuum cleaner bag of the present invention installed in an upright vacuum cleaner having a soft bag 84 surrounding vacuum cleaner bag 10. The vacuum cleaner bag is attached to the vacuum cleaner by a top mount dirt tube 86 as already described. FIG. 36 shows in cross-sectional side view the vacuum cleaner bag of the present invention installed in an upright vacuum cleaner having soft bag 84 surrounding vacuum cleaner bag 10. In this case the vacuum cleaner bag of the present invention is attached to a bottom mount dirt tube 88. The bag is attached to the dirt tube in an essentially leak-proof manner using a dirt tube o'ring 90

Figure 37:
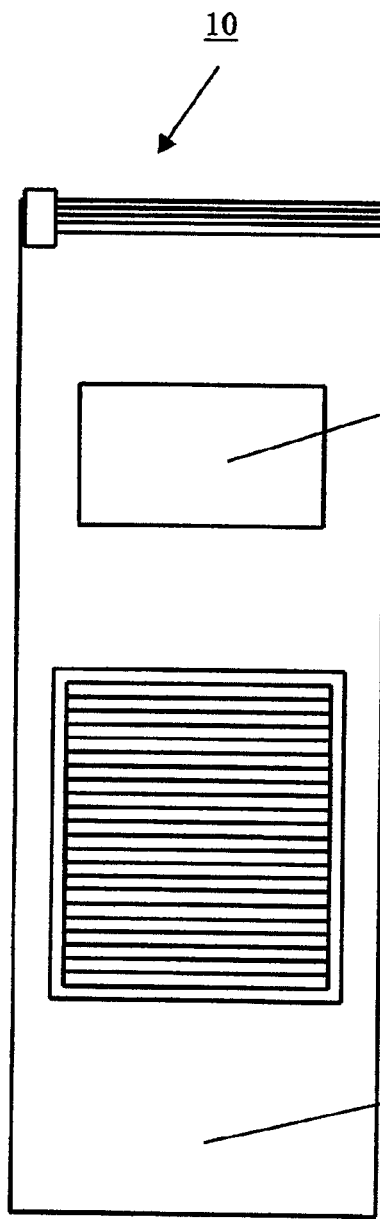
FIG. 37 is a back view of the vacuum collection bag of the present invention manufactured from opaque media having a transparent window for inspection contents of bag.
Figure 38:
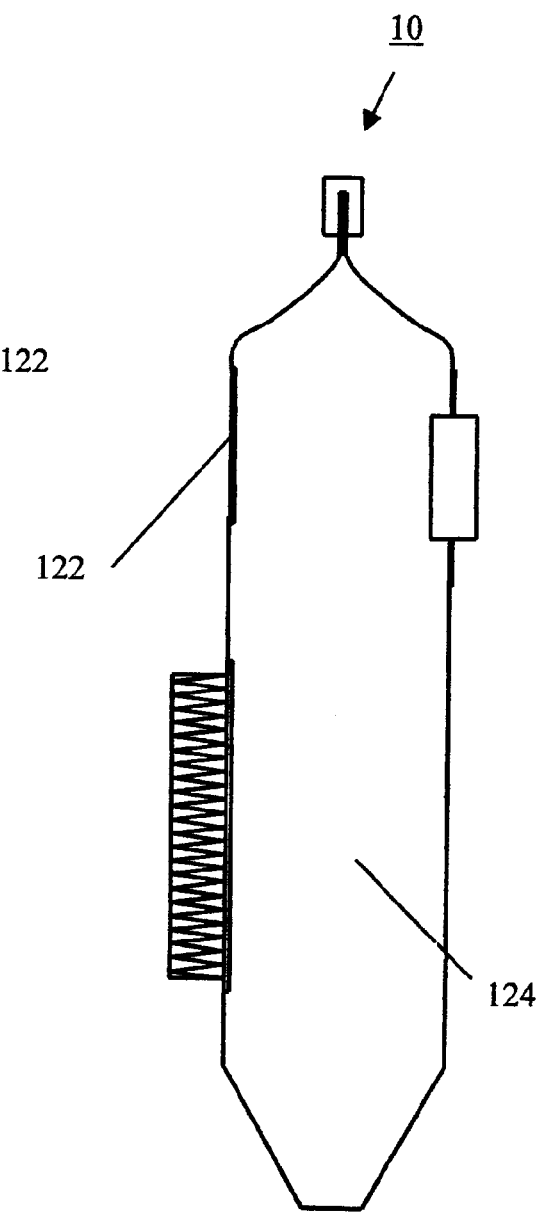
FIG. 38 is a side view of the vacuum collection bag shown in FIG. 37.

When an opaque impermeable media 124 is employed in the reusable vacuum collection bag of the present invention, as shown in FIGS. 37 and 38 a transparent window 122 can be installed to allow visual inspection of the bag's contents without opening the bag. The transparent window can be constructed of any transparent or tinted material such as cellophane, clear polyethylene or polypropylene films etc. The window is ideally located at the top of the bag so that it can be determined if the dirt tube is blocked by dirt. However, a clear window of any size on any panel is functional since it allows the vacuum operator to inspect the inside of the bag for inadvertently collected items.

Although having the air-permeable particle separator 22 positioned in alignment with inlet 20 is not preferred, this design is within the scope of the present invention. This embodiment normally yields inferior filtration performance in comparison to a design wherein the airflow-carrying dirt impacts impermeable media 36 or a shield first, but lower filtration performance may be acceptable in some applications.

The present invention applies to canister, central and wet/dry vac classes of vacuum cleaners as well as upright vacuum cleaners used in the previous illustrations. Furthermore, it is anticipated that the present invention will be advantageous in all appliances wherein large ranges of debris sizes are collected. Examples include lawn mover clippings or leaf bags, leaf collections system bags, woodshop dust collectors, carpet shampoo machines, and power tool dust collection systems.

Operation

The manner of using the present invention is very similar to using a paper bag filter in a vacuum cleaner. Referring to FIG. 1, the operator of vacuum cleaner 12 removes (optional) hard bag cover 24 and if necessary removes the disposable paper bag filter. Improved vacuum cleaner bag 10 of the present invention is installed by securing bag seal 14 to dirt tube 16. The hard bag cover is then reinstalled if vacuum cleaner is so equipped.

Dirt 18 is collected in the vacuum cleaner bag by turning the suction unit (not shown) on and using the vacuum cleaner to clean carpet, bare floors etc. The dirt is normally pneumatically conveyed into the vacuum cleaner bag through inlet 20. The dirt impacts the opposite interior wall of bag, loses velocity and circulates in the bag interior until it settles to the bottom of the bag and the air exits only through air-permeable particle separator 22 leaving the dirt in the bag. An optional shield (not shown) can be utilized to slow down dirt particles and protect the air-permeable particle separator. Clean air 32 exits the vacuum cleaner into the room usually without requiring additional filtration.

The odor of the dirt stored in the bag between uses does not increase due to the antimicrobial treatment of vacuum cleaner bag 10 inhibiting bacteria and mold growth. Pre-filter 80 can remove residual odors, trap large dirt, or add scent as air exits vacuum.

When translucent impermeable media 36 is used, the operator of the vacuum cleaner can easily inspect vacuum cleaner bag 10 contents by looking through the bag's outside cover, When opaque impermeable media 124 is used the operator can inspect the fullness of the bag by by looking through the bag's transparent window 122. To empty the vacuum cleaner bag 10 it is removed from the vacuum cleaner by disconnecting inlet 20 from dirt tube 16 at bag seal 14 and opening the bag open-end 48.

To empty the first embodiment of the present invention, the impermeable media is unfolded at bag open-end 46 and dirt 18 is dumped out through the opening. If desired, the bag is filled with water and the interior of the vacuum cleaner bag, including the air-permeable particle separator, is washed with water or water with detergent. Once the vacuum cleaner bag is dry it is reinstalled and reused. Odor is also eliminated by dumping the contents of the bag after each use or when convenient.

FIG. 9 shows a second alternate opening of vacuum cleaner bag 10 of the present invention. To dump the contents of the vacuum cleaner bag, the operator pulls removable-top 52 so that it separates from top-frame 54. A handle (not shown) can be added to facilitate this procedure. As the removable-top is moved away from the bag, gasket 56 breaks the seal between removable-top 52 and top-frame 54. Impermeable media 36 remains attached to top-frame 54 due to bond 58. The gasket is generally captive in either of the aforementioned components. To reinstall the removable top after dumping the bag contents, removable-top 52 is engaged with top-frame 54 in a way that gasket 56 compresses and its resilient elastomeric nature seals the gap between the two components in an essentially leak-proof manner FIG. 11 shows a third alternate bag open-end 46 of vacuum cleaner bag 10 of the present invention. Disengaging male snap closure 70 from female snap closure 72, shown in FIG. 12, allows opening attached-lid 66 by pivoting the lid around hinge 64 for dumping contents of bag. A handle (not shown) can be added to facilitate this procedure. Lid-gasket 68 breaks the seal between attached-lid 66 and attached-lid frame 62. Impermeable media 36 remains attached to attached-lid frame 62 due to bond 58. The gasket is generally captive in either of the aforementioned components. As shown, a form-in-place urethane gasket utilizes it resilient elastomeric properties to seal the gap between the two components. To close attached-lid 66 after dumping the bag contents, the attached-lid is repositioned within attached-lid frame and locked in place with the snap closures. The gasket can seal gaps between attached-lid 66 and attached-lid frame 62 in a variety of configurations known by those skilled in the art of sealing.

Referring to FIG. 13, fourth embodiment of improved vacuum collection bag 10 of the present invention equipped with slider 96 in conjunction with interlocking parts 98 is opened by moving the position of the slider 96 from second-end 110 to first-end 108. Moving the slider from second-end to first-end separates male profile 100 from female profile 102 of interlocking parts 98. In bags employing interlocking parts of a design similar to the one shown in FIGS. 17–19, the slider also maneuvers front profile track 118 and back profile track 120 in a way that it properly orients male profile 100 for disengagement with female profile 102. If necessary, end clamps 116 secure the interlocking parts 98 and prevent the slider 96 from moving off the end of the bag. As a result the bag open-end can be opened and the dirt can be removed so that the bag can be reused. Once the dirt is removed, the slider 96 is returned to its original position thus closing and sealing the bag for reuse.

FIG. 10 shows alternate bag closed-end 50 of vacuum cleaner bag 10. Permanent-bottom 60 is attached to impermeable media 36 by bond 58. Permanent-bottom 60 generally is a rigid material that provides shape and structure to vacuum cleaner bag 10.

FIG. 21 shows one embodiment of a high efficiency pleated media 44 in cross sectional view. The airflow of the vacuum cleaner generally contacts expanded polytetrafluoroethylene (PTFE) membrane 76 first and then flows through generally more permeable backer 78 on its way through air-permeable particle separator 22. Typically, fine particles become entrained in the air stream and float to the top of the bag. Larger dirt settles to the bottom of the bag. The fine dust particles are stopped by the highly efficient PTFE membrane's surface and cleaned air exits the air-permeable particle separator. The backer material provides support to the relatively thin PTFE membrane. For extra support, the PTFE membrane can be attached to the backer. Because of the non-stick nature of PTFE membrane the dust cake which builds on the membrane surface can be easily removed when emptying the bag. Moreover, for a more thorough cleaning, the hydrophobic nature of the PTFE membrane allows the bag to be filled with water or water and detergent so that the interior of the bag and air-permeable particle separator can be washed. Reversing the order of the backer and PTFE membrane so that the airflow contacts the backer first falls within the scope of the present invention but offer the performance tradeoffs of more difficult cleaning and lower strength.

FIG. 22 shows a second alternate of high efficiency pleated media 44 in a multi-layer configuration wherein the airflow-containing dirt contacts cover 74 before flowing through to reach expanded polytetrafluoroethylene (PTFE) membrane 76 and then finally backer 78.

Also shown in FIG. 14, (optional) pre-filter 80 is positioned generally between incoming air flow 82 and pleated media 44. The pre-filter stops larger particles from entering air-permeable particle separator 22 or can serve as an odor remover stage if comprised of, for example, activated charcoal Pre-filter 80 positioned after pleated media 44 or in both locations with respect to the airflow is considered within the scope of the present invention and may provide benefits in odor removal in the post position. By filtering-out the dust prior to removing the odor can extend the life of the odor-removing filter. The pre-filter can also add scent to exhaust in either position.

The present invention relates to bag filters that collect dirt having a wide range of sizes. They are commonly used in vacuum cleaners and other appliances such as lawn movers, leaf collectors, shredders, carpet shampoo machines, woodshop dust collectors, power tools and so on.

EXAMPLE 1

A vacuum cleaner bag of the present invention was constructed by cutting 4 mil thick plastic sheeting (part number 70052 35002 manufactured by Carlisle Plastics, Minneapolis, Minn.) into a 15" wide by 23" tall rectangular sheet. The sheet was folded in half longitudinally and the bottom and side were sewn together with all-purpose cotton covered thread on a Bernette 330 sewing machine. The thread holes and seams were sealed with caulk and allowed to dry. The bag was then turned inside out to improve its appearance and give the sewn edge a more finished look. A rectangular hole was cut out in roughly the position shown in FIG. 3 using a razor blade. An air-permeable particle separator made of expanded polytetrafluoroethylene (PTFE) membrane and backer was secured in the rectangular hole in a leak-proof manner with a combination of glue and caulk. The polytetrafluoroethylene (PTFE) membrane was facing the interior of the bag. The pleated media was roughly 8 pleats/inch of about ¾" depth. Approximately 2 sqft. of media was included. The cardboard bag seal from a used Hoover Z type vacuum cleaner bag (sku 73502 50781) was removed and secured to the bag in the position roughly shown in FIG. 2 using a combination of glue and caulk. The top open portion of the bag was folded over several times and secured in a closed position with two medium binder clips. The bag was installed in a Hoover Dimension (model U5209-930) vacuum cleaner by removing the hard cover and sliding the bag seal over the dirt tube. The hard cover was reinstalled.

The vacuum cleaner was used to pick-up dust on a heavily soiled medium shag carpet. The vacuum cleaner with the prototype bag previously described provided the same pick-up performance as a new paper bag filter manufactured by Hoover. No dust was observed in the interior cavity of the vacuum cleaner when the hard cover was removed to inspect the bag. The bag was then removed, the binder clips were removed, the bag was opened and the contents were removed. For a thorough cleaning the bag interior was rinsed with water and allowed to dry. The bag was then reinstalled in the vacuum cleaner and the test was repeated. Similar pick-up results were observed when the bag was reused after dumping and washing.

EXAMPLE 2

A vacuum collection bag of the present invention was prepared according to the same specifications of Example 1 and tested in the same vacuum cleaner except microfiber-glass paper media was substituted for expanded PTFE media and a bag manufactured by Pactiv Corporation having and integral SLIDE-RITE® closure. In addition, the air-permeable particle separator contained a pre-filter comprising a net or scrim. The pre-filter was located on surface of the air-permeable particle separator located inside the bag. The bag seal was also formed of ⅛" thick Luan plywood having a hole adapted to fit the test vacuum cleaner. The wood bag seal was adhered to the bag with adhesive and thumbtacks. The vacuum cleaner was used to pickup dust on a heavily soiled medium shag carpet. The vacuum cleaner displayed adequate airflow to pickup the dirt on the carpet. No dust was observed in the interior cavity of the vacuum cleaner when the hardcover was removed. The bag was removed, the SLIDE-RITE® closure was opened, and the contents of the bag were emptied. The bag in this example, however, was not rinsed out. Instead, it was placed back in service without further cleaning. The pre-filter successfully kept large dirt from entering the pleats of the air-permeable particle separator. Similar pickup results were observed when the bag was reused.

While particular embodiments of the present invention have been illustrated and described herein, the present invention should not be limited to such illustrations and descriptions. It should be apparent that changes and modifications may be incorporated and embodied as part of the present invention within the scope of the following claims:

What is claimed is:

1. A vacuum cleaner bag comprising: a dry bag-shaped cavity formed of permeable and impermeable media portions for storing dirt; an inlet for conveying dirt into said cavity; and a resealable opening comprising interlocking continuous profiles and a slider for engaging and disengaging profiles for closing and opening said bag.

2. A vacuum cleaner bag as in claim 1 wherein said media portion is hydrophobic.

3. A vacuum cleaner bag as in claim 1 wherein said permeable media comprises air-permeable material capable of separating dirt from airflow.

4. A vacuum cleaner bag as in claim 1 wherein said permeable media includes a frame and a pleated media sealed in said frame.

5. A vacuum cleaner bag as in claim 1 wherein said permeable media includes at least one layer of expanded polytetrafluoroethylene.

6. A vacuum cleaner bag as in claim 1 wherein said permeable media includes at least one layer of microfiberglass.

7. A vacuum cleaner bag as in claim 1 wherein said permeable media includes at least one layer of paper.

8. A vacuum cleaner bag as in claim 1 wherein said permeable media includes at least one layer of non-woven.

9. A vacuum cleaner bag as in claim 1 wherein said permeable media includes at least one layer of electrostatic media.

10. A vacuum cleaner bag as in claim 1 wherein said impermeable media is transparent for observing contents within said bag.

11. A vacuum cleaner bag as in claim 1 further including antimicrobial materials.

12. A vacuum cleaner bag as in claim 1 further including odor modification means.

13. A vacuum cleaner bag as in claim 1 wherein said permeable media is replaceable.

14. A vacuum cleaner bag as in claim 1 wherein said permeable media includes a shield.

15. A vacuum cleaner bag as in claim 1 wherein said permeable media includes a pre-filter.

* * * * *